United States Patent
Georgeson et al.

(10) Patent No.: US 10,634,123 B2
(45) Date of Patent: Apr. 28, 2020

(54) APPARATUS AND METHODS FOR MAINTENANCE OF WIND TURBINE BLADES

(71) Applicant: The Boeing Company, Chicago, IL (US)

(72) Inventors: Gary E. Georgeson, Tacoma, WA (US); Joseph L. Hafenrichter, Seattle, WA (US); James J. Troy, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 112 days.

(21) Appl. No.: 15/842,368

(22) Filed: Dec. 14, 2017

(65) Prior Publication Data

US 2019/0186470 A1 Jun. 20, 2019

(51) Int. Cl.
| | |
|---|---|
| *G01M 9/00* | (2006.01) |
| *F03D 80/50* | (2016.01) |
| *B65G 17/12* | (2006.01) |
| *B65G 49/00* | (2006.01) |
| *B65G 43/00* | (2006.01) |
| *G01D 5/02* | (2006.01) |
| *G01P 15/08* | (2006.01) |
| *G01C 9/06* | (2006.01) |

(52) U.S. Cl.
CPC ............ *F03D 80/50* (2016.05); *B65G 17/12* (2013.01); *B65G 43/00* (2013.01); *B65G 49/00* (2013.01); *G01C 9/06* (2013.01); *G01D 5/02* (2013.01); *G01P 15/08* (2013.01); *F05B 2230/80* (2013.01); *F05B 2240/221* (2013.01); *F05B 2260/302* (2013.01); *F05B 2270/804* (2013.01)

(58) Field of Classification Search
CPC ................................. F03D 17/00; F03D 80/50
USPC ............................................... 73/112.01, 147
See application file for complete search history.

(56) References Cited

U.S. PATENT DOCUMENTS

| | | | |
|---|---|---|---|
| 3,789,947 | A | 2/1974 | Blumrich |
| 4,146,967 | A | 4/1979 | Rohner et al. |

(Continued)

FOREIGN PATENT DOCUMENTS

| | | |
|---|---|---|
| EP | 2698528 A1 | 2/2014 |
| EP | 2752621 A2 | 7/2014 |
| KR | 101571502 B1 | 11/2015 |

OTHER PUBLICATIONS

European Search Report dated Apr. 24, 2019 in European Patent Application No. 18202251 (European counterpart of the instant U.S. patent application).

*Primary Examiner* — Eric S. McCall
(74) *Attorney, Agent, or Firm* — Ostrager Chong Flaherty & Broitman P.C.

(57) ABSTRACT

Systems and methods for the automated non-destructive inspection of wind turbine blades. A motor-driven track that conforms to the shape of the blade moves along its length. At each spanwise position, the motor-driven track is stopped and then while the motor-driven track is stationary, any one of various types of NDI sensors is moved along the track to collect inspection data on the structure. The track is either segmented or flexible in order to conform to the cross-sectional profile of the blade. In addition, tracking the spanwise motion of the motor-driven track along the blade is provided. Optionally, avoiding protrusions on the blade that may be in the way during scanning is provided.

25 Claims, 15 Drawing Sheets

(56) References Cited

U.S. PATENT DOCUMENTS

| | | |
|---|---|---|
| 5,031,458 A | 7/1991 | Young et al. |
| 5,623,107 A | 4/1997 | Patterson, Sr. et al. |
| 5,698,787 A | 12/1997 | Parzuchowski et al. |
| 6,167,760 B1 | 1/2001 | Brunty et al. |
| 6,220,099 B1 | 4/2001 | Marti et al. |
| 6,378,387 B1 | 4/2002 | Froom |
| 6,829,959 B2 | 12/2004 | Gifford et al. |
| 7,083,383 B2 | 8/2006 | Loftus et al. |
| 7,231,826 B2 | 6/2007 | Bossi et al. |
| 7,240,556 B2 | 7/2007 | Georgeson et al. |
| 7,315,609 B2 | 1/2008 | Safai et al. |
| 7,337,673 B2 | 3/2008 | Kennedy et al. |
| 7,562,593 B2 | 7/2009 | Engelbart et al. |
| 7,626,383 B1 | 12/2009 | Sun et al. |
| 7,640,811 B2 | 1/2010 | Kennedy et al. |
| 7,716,989 B2 | 5/2010 | Kollgaard |
| 8,347,746 B2 | 1/2013 | Hafenrichter et al. |
| 8,483,356 B2 | 7/2013 | Bendahan |
| 8,743,196 B2 | 6/2014 | Fritz et al. |
| 8,807,257 B1 | 8/2014 | Hansen et al. |
| 8,892,252 B1 | 11/2014 | Troy et al. |
| 9,156,321 B2 | 10/2015 | Troy et al. |
| 9,302,787 B2 | 4/2016 | Hafenrichter et al. |
| 9,481,082 B1 | 11/2016 | Hafenrichter et al. |
| 9,574,549 B2 | 2/2017 | Lee et al. |
| 9,643,313 B2 | 5/2017 | Hafenrichter et al. |
| 2002/0036108 A1 | 3/2002 | Jeswine et al. |
| 2003/0147493 A1 | 8/2003 | Bueno et al. |
| 2006/0043303 A1 | 3/2006 | Safai et al. |
| 2006/0055396 A1 | 3/2006 | Georgeson et al. |
| 2007/0096727 A1 | 5/2007 | Rempt et al. |
| 2009/0038398 A1 | 2/2009 | Lavoie et al. |
| 2010/0011864 A1 | 1/2010 | Hanan et al. |
| 2010/0132137 A1 | 6/2010 | Eggleston |
| 2011/0178727 A1 | 7/2011 | Hafenrichter et al. |
| 2011/0318496 A1 | 12/2011 | Jensen et al. |
| 2012/0060611 A1 | 3/2012 | Thommen-Stamenkov et al. |
| 2012/0103705 A1* | 5/2012 | Schlee .................... B25J 5/007 180/14.1 |
| 2012/0153032 A1 | 6/2012 | Svanebjerg et al. |
| 2013/0261876 A1 | 10/2013 | Froom et al. |
| 2013/0289766 A1 | 10/2013 | Hafenrichter et al. |
| 2013/0298682 A1 | 11/2013 | Motzer et al. |
| 2013/0300855 A1* | 11/2013 | Fritz .................... G01N 21/954 348/82 |
| 2013/0304251 A1 | 11/2013 | Garvey et al. |
| 2019/0079031 A1* | 3/2019 | Safai .................... G01N 23/02 |

\* cited by examiner

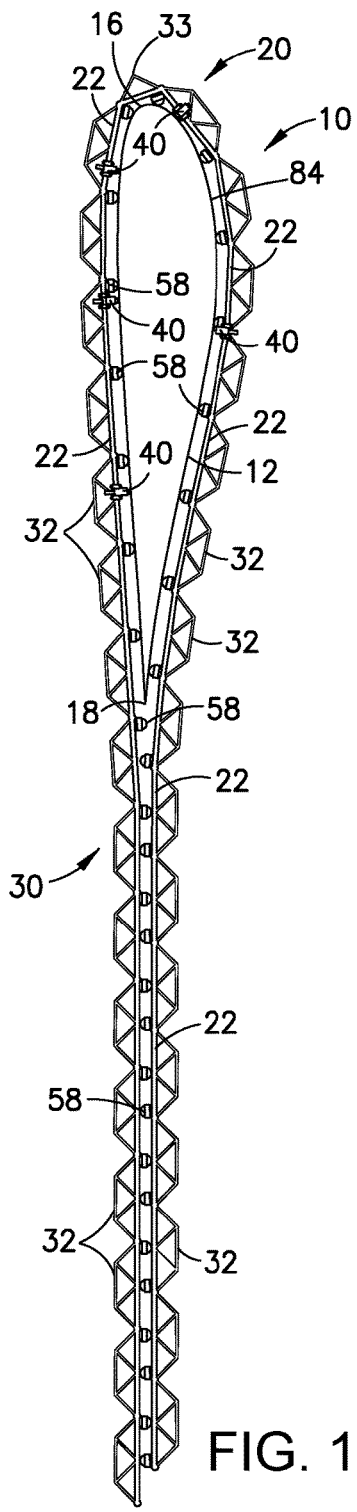
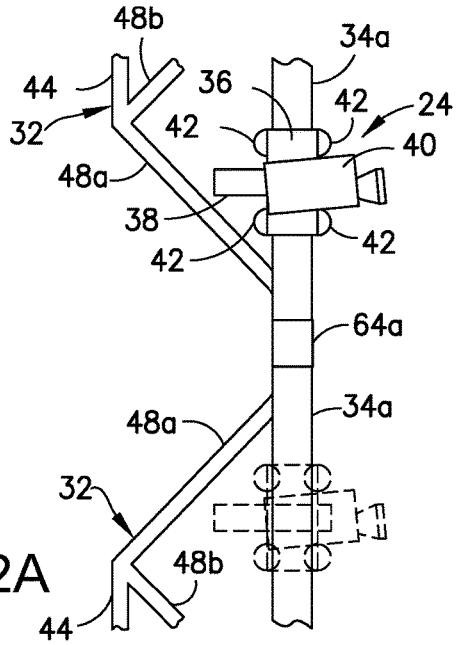
FIG. 2A
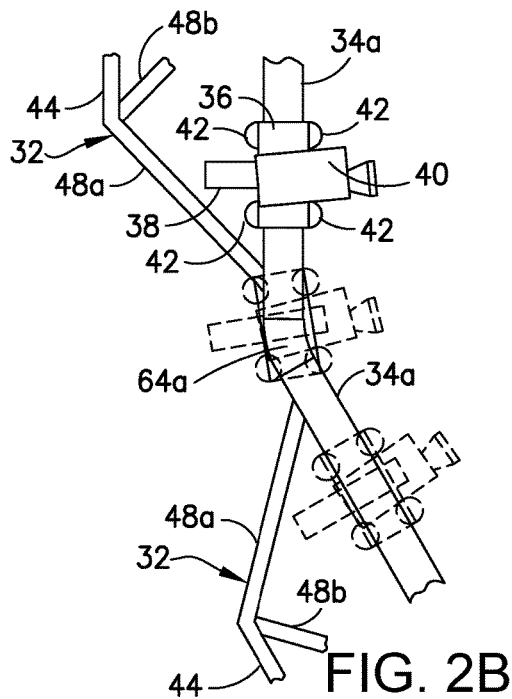
FIG. 2B
FIG. 1

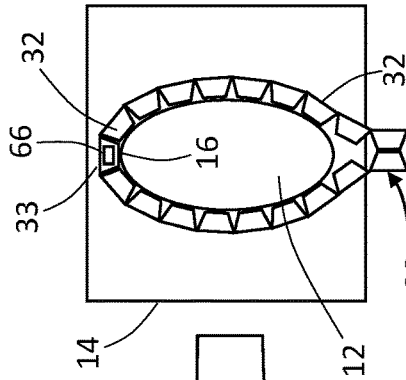
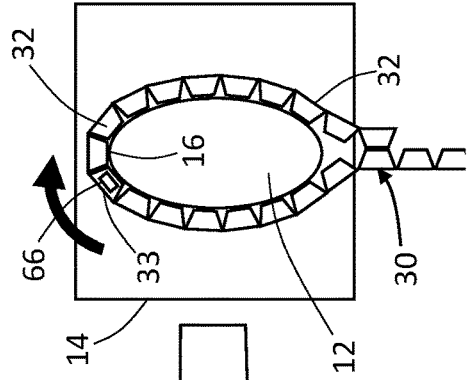
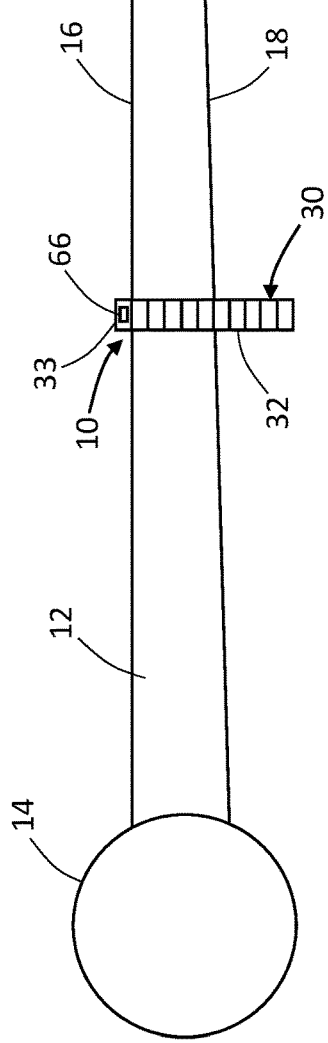
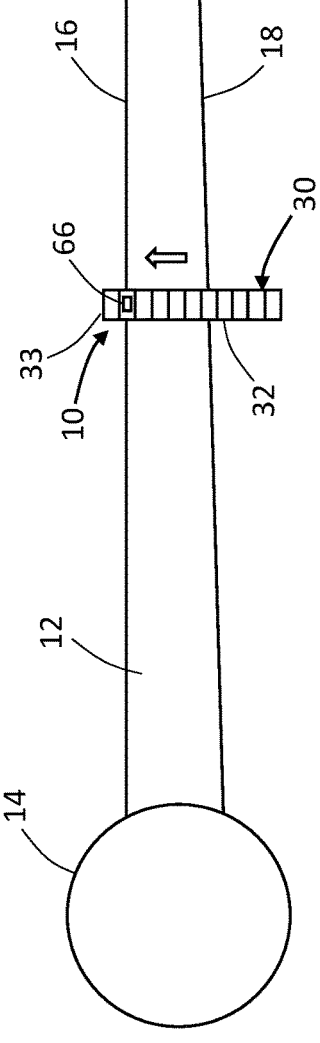

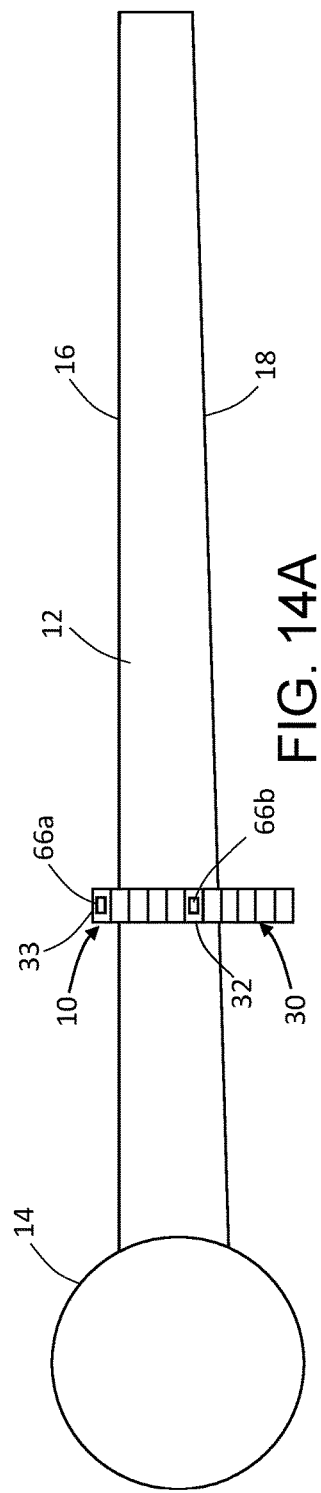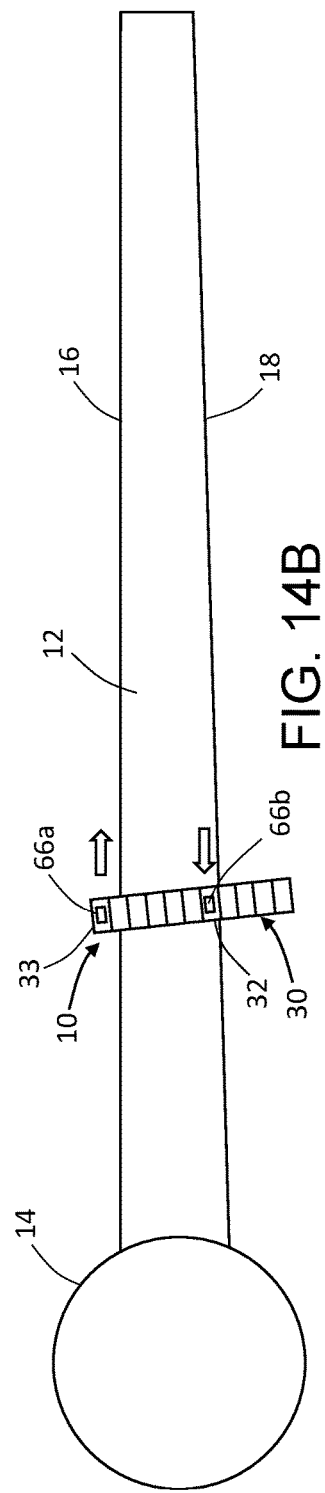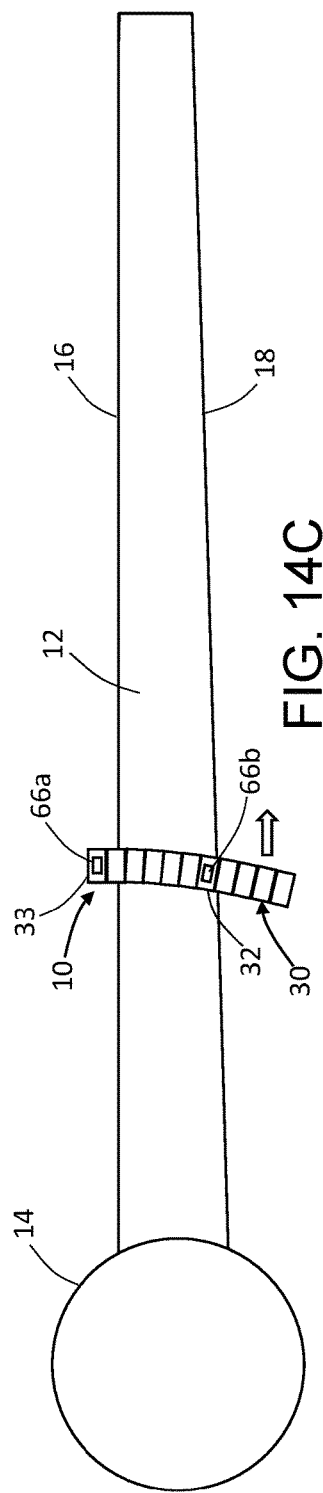

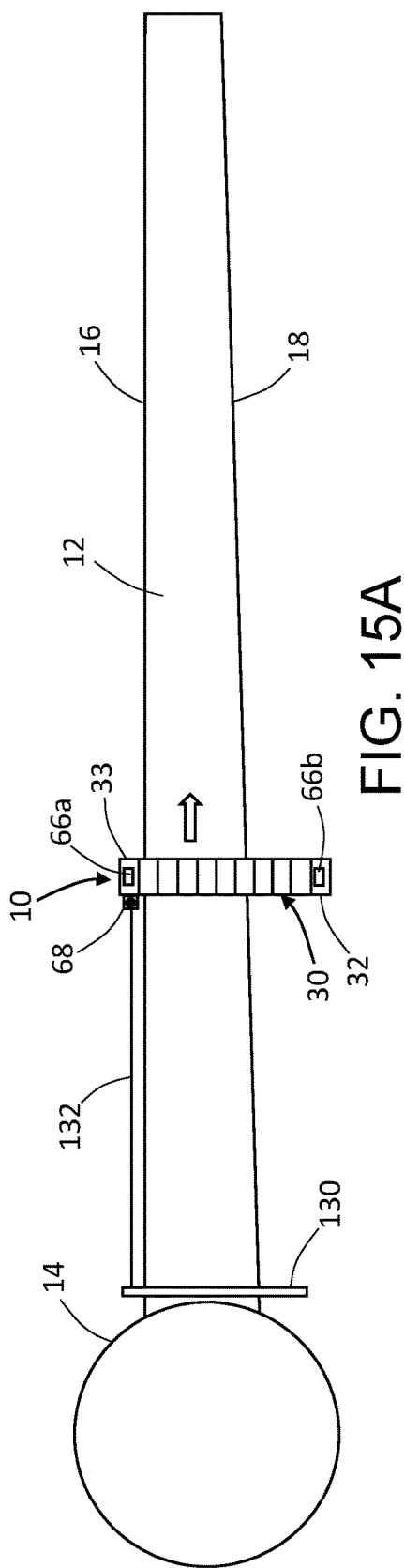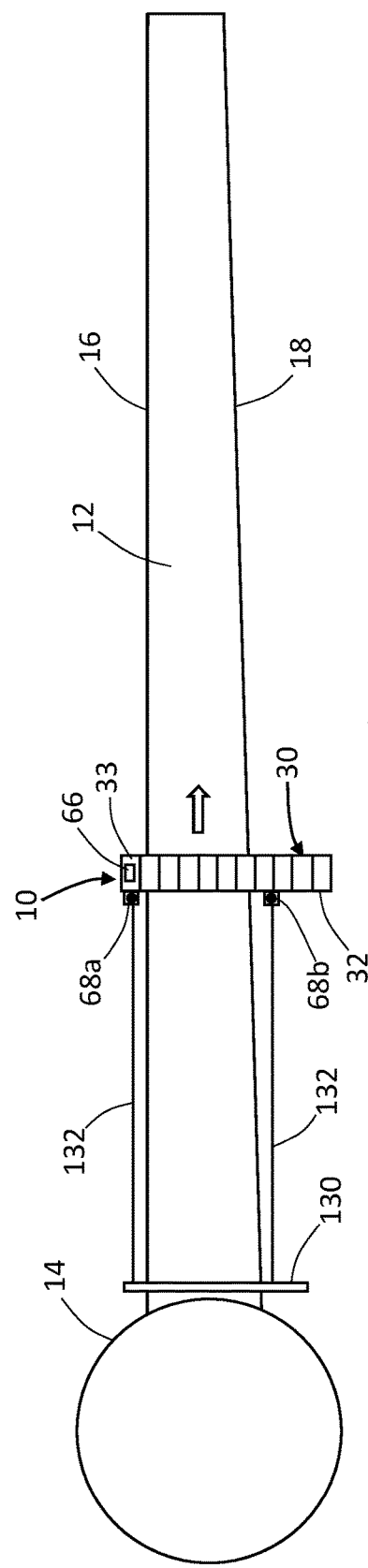

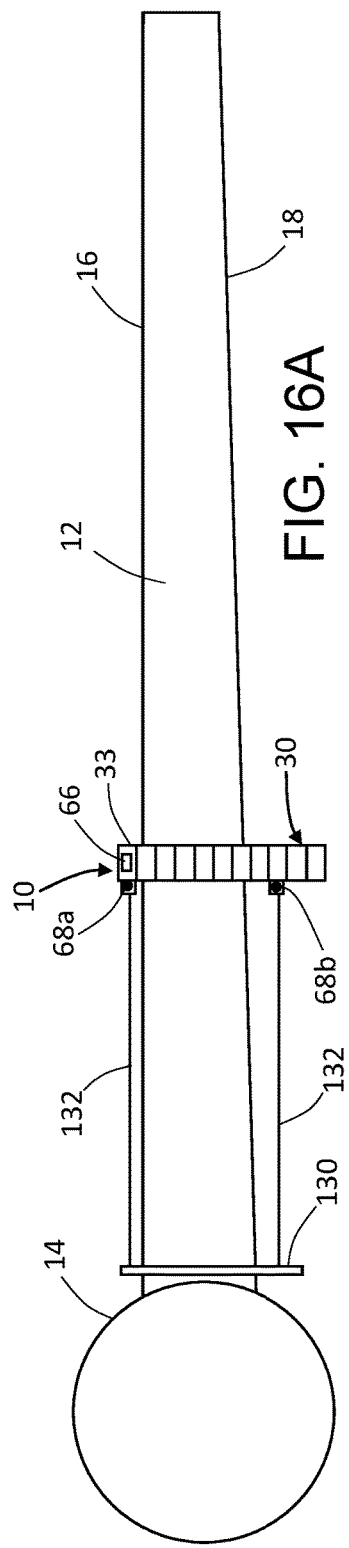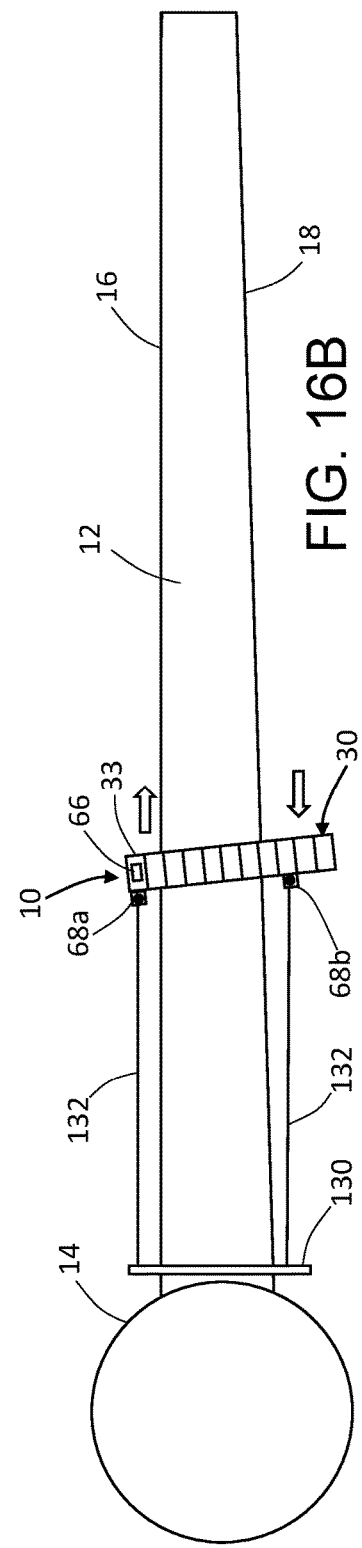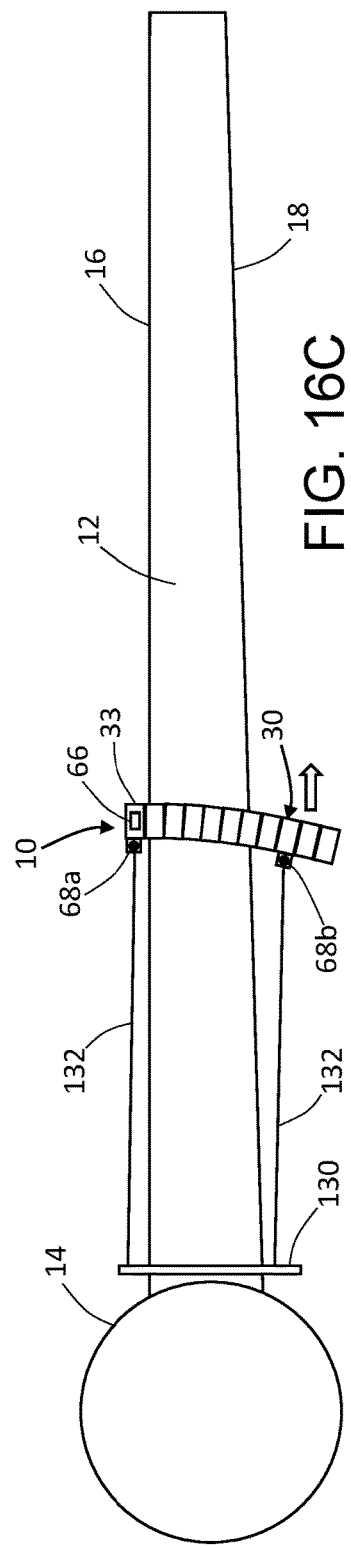

APPARATUS AND METHODS FOR MAINTENANCE OF WIND TURBINE BLADES

BACKGROUND

The present disclosure relates generally to the field of automated maintenance (including non-destructive inspection) of wind turbine blades, and more particularly to an automated end effector-carrying apparatus that is coupled to and travels along a wind turbine blade while performing a maintenance function. As used herein, the term "maintenance" includes, but is not limited to, operations such as nondestructive inspection, drilling, scarfing, grinding (e.g., to remove bonded or bolted components), fastening, applique application, ply mapping, cleaning, marking and painting.

A typical wind turbine has a multiplicity of blades extending radially outward from a central hub, to which the roots of the blades are attached. The hub is rotatably coupled to a nacelle that is supported at a height above ground by a tower. The blades are configured to generate aerodynamic forces that cause the wind turbine to rotate in response to wind impinging on the blade surfaces. The nacelle houses an electric generator which is operatively coupled to the hub. The electric generator is configured to generate electrical power as the hub rotates.

Wind turbine blades are typically made of laminated fiber-reinforced plastic material and designed so that the wind energy is converted into rotational motion efficiently. Blade efficiency is generally dependent upon blade shape and surface smoothness. However, during operation the wind turbine blades may be exposed to debris that has the potential to reduce wind turbine efficiency or may be subjected to damage that has the potential to adversely affect structural integrity. Thus, it is common practice to visually inspect the exterior of each blade to identify potential structural anomalies or perform some other maintenance operation on the exterior, such as cleaning.

It is known to manually inspect and clean wind turbine blades by hoisting a person to a position adjacent to each blade via suspension from the tower, the hub, or a proximately located crane. However, manual blade inspection and cleaning can be time-consuming and difficult operations. To mitigate the drawbacks of manual inspection and cleaning, various solutions involving an apparatus configured to travel in a spanwise direction along the length of a wind turbine blade have been proposed. However, there is ample scope for improvements in the state of this art.

SUMMARY

The subject matter disclosed herein is directed to an automated apparatus for performing maintenance functions (e.g., non-destructive inspection) on wind turbine blades without the necessity of removing the blades from the wind turbine. In accordance with various embodiments, the automated apparatus (also referred to herein as a "conformable crawler") comprises: a motorized chassis configured to conform to the external profile of the wind turbine blade and then move in a spanwise direction along the turbine blade, the motorized chassis having a track that is disposed around the exterior of the blade (including its leading edge); a motorized carriage configured to move along the track (preferably while the motorized chassis is stationary); and an end effector adjustably coupled to the motorized carriage to enable self-adjustment of its orientation relative to the confronting surface area of the wind turbine blade. For example, if the end effector is a non-destructive inspection (NDI) sensor with surface-riding elements (e.g., rollers or balls), then the adjustable coupling would allow the NDI sensor to adjust its orientation so that emitted radiation is incident on the blade surface at an optimal angle (e.g., normal to the surface). In addition, means for tracking the spanwise motion of the motorized chassis along the blade are provided. Optionally, means are provided for enabling rolling elements (such as ball and socket bearings) to avoid protrusions on the blade surface that may obstruct the rolling element during scanning.

The end effector may be selected from a group of interchangeable end effectors, including NDI sensors of different types (e.g., an ultrasonic transducer array, an infrared thermography unit, a video camera, an optical three-dimensional coordinate measuring machine or a laser line scanner), a cleaning unit, and so forth. In accordance with one implementation, the automated apparatus comprises a conformable crawler capable of supporting any one of a plurality of end effectors for performing a set of maintenance functions on a wind turbine blade. Included in these maintenance functions are multiple options for non-destructive inspection, drilling, grinding, fastening, applique application, scarfing, ply mapping, cleaning, marking, and painting. The conformable crawler is movable in a spanwise direction and comprises a carriage that is movable in a plane that ideally is perpendicular to the spanwise direction of travel and along a path that follows the contours of the external surface of the blade. A selected end effector can be coupled to the carriage. In accordance with each maintenance operation, the selected end effector can be moved along the contour-following path while the conformable crawler is not moving in the spanwise direction. As a whole, the conformable crawler disclosed herein reduces maintenance time, labor hours and human errors and increases safety when robotic maintenance functions are performed on wind turbine blades.

Although various embodiments of apparatus and methods for enabling automated movement of an end effector over a surface of a wind turbine blade during the performance of a maintenance function are described in some detail later herein, one or more of those embodiments may be characterized by one or more of the following aspects.

One aspect of the subject matter disclosed in detail below is an automated apparatus for moving an end effector over a surface of a wind turbine blade. The automated apparatus comprises a chassis, a carriage movably coupled to the chassis, and an end effector (e.g., a non-destructive inspection sensor) adjustably coupled to the carriage for adjusting an orientation of the end effector relative to the carriage, wherein the chassis comprises: a segmented frame comprising a multiplicity of frame links coupled in series to form a chain, each frame link comprising a respective side rail; a multiplicity of flexible rail joints which are arranged to connect the side rails of the segmented frame in series to form a track to which the carriage is movably coupled; a motor mounted to the segmented frame; and a drive rolling element operatively coupled to the motor. In accordance with the embodiments disclosed in detail herein, the chassis further comprises: a multiplicity of sets of hinges, each pair of coupled frame links of the segmented frame being pivotably coupled by a respective set of hinges; and respective motors operatively coupled to respective hinges of at least one pair of hinges for driving relative rotation of coupled frame links of the segmented frame. In addition, the chassis comprises at least one jackscrew pivotably coupled to a pair of coupled frame links of the segmented frame for driving relative rotation of those coupled frame links.

The automated apparatus described in the preceding paragraph may further include one or more of the following features:

(1) The chassis comprises a locking device comprising a first locking component mounted to one frame link of the segmented frame and a second locking component mounted to another frame link of the segmented frame that is not pivotably coupled to the one segment, and the first and second locking components of the locking device are configured to produce a force that prevents relative movement of the frame links to which the first and second locking components are mounted. In accordance with one embodiment, the first locking component is an electro-permanent magnet and the second locking component is a ferromagnetic element.

(2) The chassis comprises a multiplicity of ball and socket bearings coupled to the segmented frame. In the disclosed embodiments, the ball and socket bearings are retractable.

(3) The chassis comprises a multiplicity of vacuum adherence devices coupled to the segmented frame. For example, the vacuum adherence devices may comprise floating suction cups.

(4) The carriage comprises a plurality of wheels configured to roll along the track and a motor operatively coupled to at least one wheel of the plurality of wheels for driving rotation of the at least one wheel.

(5) The automated apparatus further comprises an inclinometer or inertial measurement unit (IMU) mounted to a center frame link of the segmented frame for measuring the slope of the center frame link frame.

(6) The automated apparatus further comprises a position sensor mounted to the segmented frame. In accordance with one embodiment, the position sensor is a string encoder.

Another aspect of the subject matter disclosed in detail below is an automated apparatus for moving an end effector over a surface of a wind turbine blade, comprising a chassis, a carriage movably coupled to the chassis, and an end effector adjustably coupled to the carriage for adjusting an orientation of the end effector relative to the carriage, wherein the chassis comprises: a segmented frame comprising a multiplicity of frame links and a multiplicity of sets of hinges which rotatably couple the frame links in series, each frame link comprising a respective side rail; a multiplicity of flexible rail joints, each flexible rail joint being arranged to connect side rails of pivotably coupled frame links to each other to form a track to which the carriage is movably coupled; a multiplicity of ball and socket bearings coupled to the segmented frame; a first motor mounted to one of the frame links of the segmented frame; and a first omnidirectional wheel operatively coupled to the first motor. In the disclosed embodiments, the automated apparatus further comprises: a second motor mounted to one of the frame links of the segmented frame; a second omnidirectional wheel operatively coupled to the second motor; an inclinometer or IMU mounted to one of the frame links of the segmented frame; a position sensor mounted to one of the frame links of the segmented frame; and a computer system disposed onboard the chassis and configured to control the first motor in dependence on sensor data received from the inclinometer or the IMU and control the second motor in dependence on sensor data received from the position sensor.

In accordance with some embodiments of the automated apparatus described in the previous paragraph, the chassis further comprises: respective motors operatively coupled to respective hinges for driving relative rotation of coupled frame links of the segmented frame; and first and second locking elements of a locking device respectively mounted to first and second frame links which are not coupled to each other by hinges. In these embodiments, the computer system is further configured to control the motors to bring the first and second locking elements into proximity with each other and then control at least the first locking element to lock the locking device.

In accordance with other embodiments, the chassis further comprises: at least one jackscrew pivotably coupled to each one of a multiplicity of pairs of coupled frame links of the segmented frame for driving relative rotation of those coupled frame links; and first and second locking elements of a locking device respectively mounted to first and second frame links which are not coupled to each other by hinges. In these embodiments, the computer system is further configured to control the jackscrews to bring the first and second locking elements into proximity with each other and then control at least the first locking element to lock the locking device.

A further aspect of the subject matter disclosed in detail below is a method for moving an end effector over an external surface of a wind turbine blade, comprising: (a) wrapping a segmented frame of an automated apparatus around the external surface of the wind turbine blade, the segmented frame being placed so that multiple ball and socket bearings mounted to the segmented frame and drive rolling elements are in contact with the external surface of the wind turbine blade; (b) moving the end effector over the external surface in a first plane perpendicular to a spanwise direction of the wind turbine blade by moving a motorized carriage-end effector subassembly along a track that is part of the segmented frame while the segmented frame is at a first spanwise position; (c) moving the segmented frame from the first spanwise position to a second spanwise position by activating the drive rolling elements; and (d) moving the end effector over the external surface in a second plane perpendicular to the spanwise direction by moving the carriage-end effector subassembly along the track while the segmented frame is at the second spanwise position.

In accordance with some embodiments of the method described in the preceding paragraph, the end effector is a non-destructive inspection sensor, and the method further comprises: acquiring first non-destructive inspection sensor data during step (b); acquiring second non-destructive inspection sensor data during step (d); and stitching the first and second non-destructive inspection sensor data together.

Yet another aspect of the subject matter disclosed in detail below is a method for adjusting a peripheral position of an automated apparatus relative to a wind turbine blade, comprising: (a) placing the automated apparatus so that a center frame link of a segmented frame of the automated apparatus is adjacent a horizontally disposed leading edge of the wind turbine blade and so that motorized omnidirectional wheels and ball and socket bearings coupled to the segmented frame are in contact with an external surface of the wind turbine blade on both sides of the leading edge of the wind turbine blade, wherein the motorized drive rolling elements have axes of rotation which are parallel or nearly parallel with the leading edge of the wind turbine blade; (b) measuring a slope of the center frame link; (c) determining whether the measured slope deviates from zero degrees; and (d) in response to a determination in step (c) that the measured slope deviates from zero degrees, actuating the motorized drive rolling elements to roll on the external surface of the wind turbine blades in directions that cause a deviation of the measured slope from zero degrees to decrease in magnitude.

A further aspect is an automated apparatus for moving an end effector over a surface of a wind turbine blade, comprising a chassis and an end effector adjustably coupled to the chassis for adjusting an orientation of the end effector relative to the chassis, wherein the chassis comprises: a segmented frame comprising a multiplicity of frame links pivotably coupled by hinges in series to form a chain; a multiplicity of ball and socket bearings coupled to the segmented frame; a motor mounted to the segmented frame; and a drive rolling element operatively coupled to the motor. In accordance with one embodiment, each frame link comprises a respective rail support segment, and the chassis further comprises a flexible rail coupled to the rail support segments to form a track which bridges gaps between confronting ends of the rail support segments and to which the carriage is movably coupled.

Other aspects of an automated apparatus for moving an end effector over a surface of a wind turbine blade are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 1 is a diagram representing an end view of a wind turbine blade disposed with its leading edge horizontal and having a conformable crawler wrapped around an external surface of the blade with portions of the segmented frame of the conformable crawler hanging below the trailing edge of the blade.

FIG. 2A is a diagram representing a side view of respective coupled portions of coupled frame links of the conformable crawler depicted in FIG. 1 when respective side rails of those frame links are aligned.

FIG. 2B is a diagram representing a side view of respective coupled portions of coupled frame links of the conformable crawler depicted in FIG. 1 when respective side rails of those frame links are not aligned.

FIG. 12A is a diagram representing a front view of a wind turbine blade having a portion of a conformable crawler of the type depicted in FIG. 1 wrapped around the external surface of the blade, the segmented frame of the conformable crawler including a center frame link having an IMU mounted thereto.

FIG. 12B is a diagram representing an end view of the wind turbine blade in the scenario depicted in FIG. 12A, wherein the center frame link is centered above and level with a horizontal leading edge of the blade.

FIGS. 13A and 13B are diagrams similar to FIGS. 12A and 12B respectively, except that in the scenario depicted in FIGS. 13A and 13B, the center frame link is not centered above and level with the horizontal leading edge of the blade.

FIGS. 14A, 14B and 14C are diagrams representing respective front views of a wind turbine blade having a portion of a conformable crawler wrapped around the external surface of the blade, the segmented frame of the conformable crawler including a center frame link having a first IMU mounted thereto and two frame links having second and third IMUs respectively mounted thereto (the third IMU is not visible). FIG. 14A shows the segmented frame in a properly aligned position, whereas FIGS. 14B and 14C show the segmented frame in respective misaligned positions that require corrective motion.

FIG. 15A is a diagram representing a front view of a wind turbine blade having a portion of a conformable crawler of the type depicted in FIG. 1 wrapped around the external surface of the blade, the segmented frame of the conformable crawler including a center frame link having an IMU and a string encoder mounted thereto.

FIG. 15B is a diagram representing a front view of a wind turbine blade having a portion of a conformable crawler of the type depicted in FIG. 1 wrapped around the external surface of the blade, the segmented frame of the conformable crawler including a center frame link having an IMU and a first string encoder mounted thereto and two frame links (on opposite sides of the center frame link) having second and third string encoders respectively mounted thereto (the third string encoder is not visible).

FIGS. 16A, 16B and 16C are diagrams representing respective front views of a wind turbine blade having a portion of a conformable crawler wrapped around the external surface of the blade, the segmented frame of the conformable crawler a center frame link having an IMU and a first string encoder mounted thereto and two frame links (on opposite sides of the center frame link) having second and third string encoders respectively mounted thereto (the third string encoder is not visible). FIG. 16A shows the segmented frame in a properly aligned position, whereas FIGS. 16B and 16C show the segmented frame in respective misaligned positions that require corrective motion.

Reference will hereinafter be made to the drawings in which similar elements in different drawings bear the same reference numerals.

DETAILED DESCRIPTION

Figure 3:
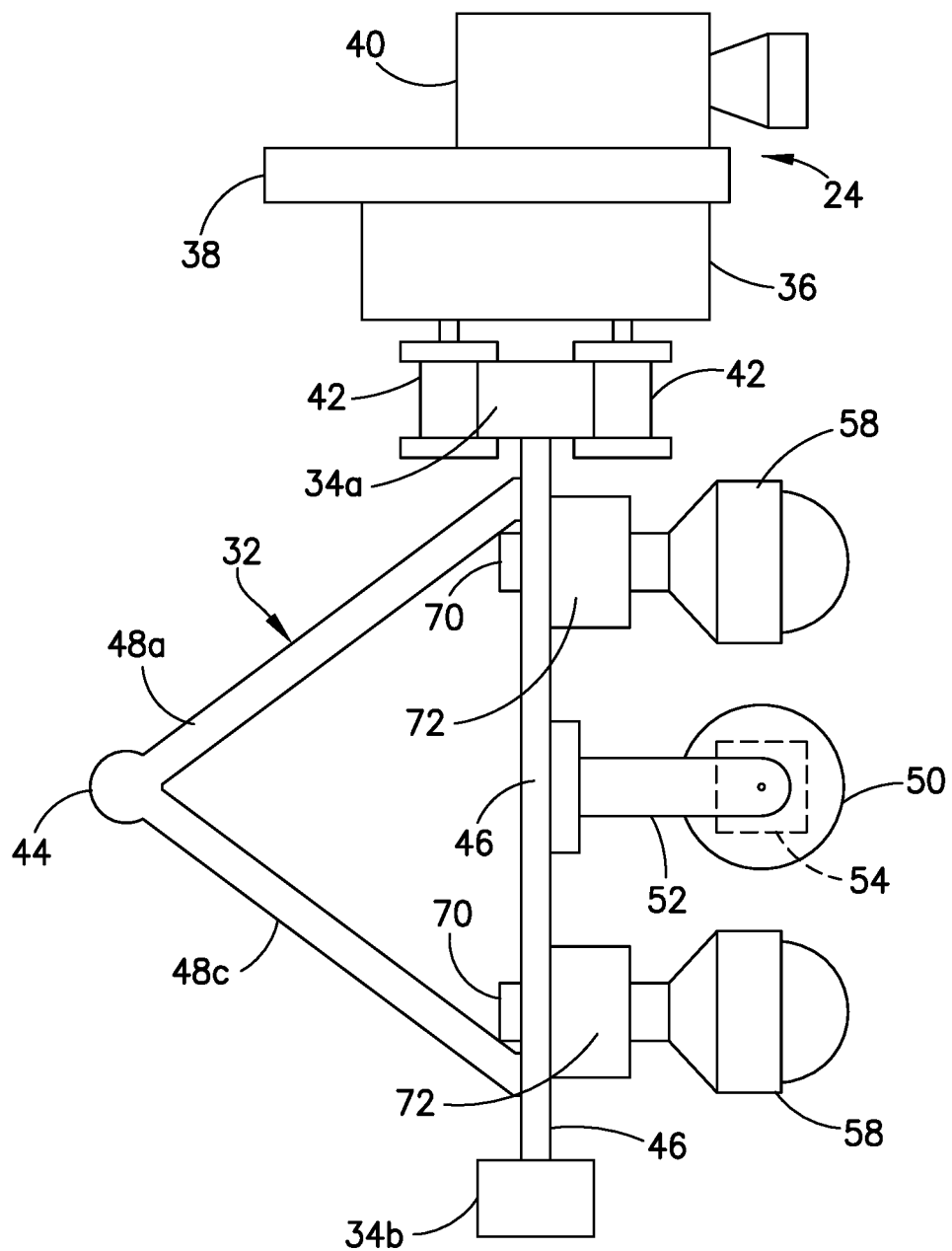
FIG. 3 is a diagram representing an end view of a frame link that has a carriage-end effector subassembly movably coupled to a side rail, a pair of ball and socket bearings and a drive rolling element.

For the purpose of illustration, systems and methods for performing automated maintenance operations on a wind turbine blade will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As used herein, the term "wind turbine blade" refers to a body having a leading edge and a trailing edge connected by upper and lower surfaces that extend from a root to a tip of the blade. The cross-sectional profile of the blade may change in size and shape from the root to the tip. As used herein, the term "maintenance" includes, but is not limited to, operations such as non-destructive inspection (NDI), drilling, scarfing, grinding (e.g., to remove bonded or bolted components), fastening, appliqué application, ply mapping, cleaning and painting. Any one of a multiplicity of end effectors for performing a respective one of the foregoing maintenance functions can be attached to the automated apparatus disclosed.

A blade maintenance device is a device that performs a maintenance operation, such as inspection of a wind turbine blade, or cleaning of an external surface of the wind turbine blade, while travelling along the blade. When the maintenance operation is performed, the blade is maintained in an angular position such that its leading edge is approximately horizontally, and a pitch of the blade is adjusted so that the leading edge faces upward, and then, the blade maintenance device is positioned on the blade.

FIG. 1 is a diagram representing an end view of a wind turbine blade 12 disposed with its leading edge 16 approximately horizontal and having an automated, self-propelled apparatus (hereinafter "automated apparatus 10") wrapped around an external surface 84 of the wind turbine blade 12 with portions of the automated apparatus 10 hanging below the trailing edge 18 of the wind turbine blade 12. In accordance with the design shown in FIG. 1, the automated apparatus 10 is designed to enable one or more end effectors 40 for performing a maintenance operation to be scanned over the external surface 84. In some applications, the end effectors 40 are NDI sensors which acquire data representing characteristics of the blade structure.

As seen in FIG. 1, the automated apparatus 10 for moving a multiplicity of end effectors 40 over an external surface 84 of a wind turbine blade 12 comprises a chassis 20. The chassis 20 comprises a segmented frame 30 and a multiplicity of ball and socket bearings 58 coupled to the segmented frame 30. The ball and socket bearings 58 are disposed so that when the chassis 20 is placed on a flat surface with all frame links 32 aligned, the balls of the multiplicity of ball and socket bearings 58 can all contact that flat surface. In the scenario depicted in FIG. 1, the frame links 32 are disposed so that the balls of at least some of the ball and socket bearings 58 are in contact with the external surface of the wind turbine blade 12. Each ball and socket bearing 58 allows rolling in any direction at the point where the ball contacts a surface. For example, when the segmented frame 30 is properly positioned and locked in place, the ball and socket bearings 58 allow the chassis 20 to translate in a spanwise direction along the length of the wind turbine blade 12 (i.e., into and out of the page in the view seen in FIG. 1). The ball and socket bearings 58 can be similar to any one of a plurality of commercially available types of ball and socket bearings. When ball and socket bearings are used, a nearly frictionless omni-directional alignment device is provided.

In accordance with the embodiment depicted in FIG. 1, the segmented frame 30 comprises a center frame link 33 placed near the leading edge 16 of the wind turbine blade 12 and respective multiplicities of frame links 32 which extend downward from the center frame link 133, along both sides of and beyond the trailing edge 18 of the wind turbine blade 12. The frame links 32 disposed below the trailing edge 18 will be referred to herein as "excess frame links". The frame links 32 and the center frame link 33 are pivotably coupled (e.g., by hinges) in series to form a chain, with the center frame link 133 in the middle of the chain, but not necessarily precisely at the center of the chain. At least some of the mutually opposing excess frame links 32 can be locked together to maintain the segmented frame 30 in a correct position during a maintenance procedure. As will be explained in more detail below, the "correct" position may be selected to be a position whereat the center frame link 33 is situated at the leading edge 16 of the wind turbine blade 12 and oriented to have a slope of zero degrees relative to a horizontal plane. As the chord length of the wind turbine 12 profile changes in a spanwise direction, frame links previously in contact with the external surface 84 of the wind turbine blade 12 may become excess frame links and vice versa, in which case the specific excess frame links 32 which are to be locked may be changed.

The segmented frame 30 further comprises a track 22 on one side thereof. Optionally, the segmented frame may have a second track (not shown in FIG. 1) on the other side. The track 22 extends continuously from one end to the other end of the segmented frame 30. As indicated in FIG. 1, a multiplicity of end effectors 40 may be coupled to the track 22 for travel therealong.

FIGS. 2A and 2B are diagrams representing side views of respective coupled portions of two pivotably coupled frame links 32 of the automated apparatus 10 in accordance with one embodiment. In this example, the frame links 32 are in the form of truss links comprising multiple interconnected beams. In FIGS. 2A and 2B, only portions of top beam 44 and interior beams 48a and 48b are shown. Each frame link 32 seen in FIGS. 2A and 2B further comprises a side rail 34a. The two side rails 34a are connected by a flexible rail joint 64a. In FIG. 2A, those side rails 34a are shown aligned; in FIG. 2B, those side rails 34a are shown misaligned. It should be appreciated that each of the frame links 32 and the center frame link 33 depicted in FIG. 1 comprises a respective side rail 34a, which side rails 34a are connected by flexible rail joints 64a to form the track 22. Each flexible rail joint 64a may be made of an elastomeric material (e.g., rubber) or flexible interlocking segments.

As seen in FIG. 2A, a carriage-end effector subassembly 24 is movably coupled to the side rail 34a of one of the frame links. The carriage-end effector subassembly 24 comprises a carriage 36, a spring-loaded mounting stage 38 translatably coupled to the carriage 36, and an end effector 40 pivotably coupled to the spring-loaded mounting stage 38. The carriage 36 has four wheels 42 which grip the side rail 34a, enabling the carriage-end effector subassembly 24 to travel along the side rail 34a. As seen in FIG. 2A, in which scenario the two frame links 32 are aligned, the carriage-end effector subassembly 24 can translate along the straight track from the position on one side rail 34a indicated by solid lines to the position on the other side rail 34a indicated by dashed lines. This is enabled by the ability of the carriage to traverse the flexible rail joint 64a, which is unflexed in FIG. 2A. Similarly, as seen in FIG. 2B, in which scenario the two frame links 32 are misaligned, the carriage-end effector subassembly 24 can translate along the non-straight track from the position on one side rail 34a indicated by solid lines to the position overlying the flexible rail joint 64a indicated by dashed lines, and then to the position on the other side rail 34a indicated by dashed lines. This is enabled by the ability of the carriage 36 to traverse the flexible rail joint 64a when it is in the flexed state shown in FIG. 2B.

FIG. 3 is a diagram representing an end view of a frame link 32 that has a pair of mutually parallel side rails 34a and 34b connected by a cross beam 46 near one end of the frame link 32. The side rails 34a and 34b are connected by cross beams 46. Only one cross beam 46, disposed near one end of the frame link 32, is shown in FIG. 3. A second cross beam disposed at the middle of the frame link 32 and a third cross beam disposed near the other end of frame link 32 are not shown in FIG. 3. The frame link further comprises a top beam 44 connected to the cross beams 46 by multiple interior beams 48 (see FIG. 5), of which only interior beams 48a and 48b are partly shown in FIG. 3.

Still referring to FIG. 3, a pair of ball and socket bearings 58 are translatably coupled to the frame link 32 while a drive rolling element 50 is rotatably coupled to the frame link 32. The ball and socket bearings 58 are retractable for the purpose of passing over protrusions on the external surface 84 of the wind turbine blade 12. To provide this capability, the socket of each ball and socket bearing 58 is attached to the end of a respective plunger 70 of a respective solenoid 72, which may be selectively activated to retract the plunger 72 in response to feedback from sensors mounted to the frame link 32. Different types of protrusion sensors may be employed, such as a feeler probe and a switch or an infrared proximity sensor. The solenoids may be attached to the cross beam 46. The drive rolling element 50 is rotatably coupled to a yoke 52, which is attached to the cross beam 46 in a manner such that the axis of rotation of the drive rolling element 50 is parallel to the side rails 34a and 34b. The drive rolling element 50 is driven to rotate by selective activation of a drive motor 54 that is mounted to the yoke 52. The chassis 20 may have multiple drive rolling elements 50. Rotation of the drive rolling elements 50 having axes of rotation parallel to the side rails 34a and 34b causes the chassis 20 to move in a direction perpendicular to the side rails 34a and 34b, i.e., causes the chassis 20 to move in a spanwise direction along the wind turbine blade 12. In accordance with a preferred embodiment, the drive rolling elements 50 are wheels configured to roll along the track 22, in which case the carriage drive motor 54 is operatively coupled to at least one wheel of the plurality of wheels for driving rotation of the at least one wheel.

In the example depicted in FIG. 3, a carriage-end effector subassembly 24 is movably coupled to side rail 34a for travel therealong. Optionally, another carriage-end effector subassembly (not shown in FIG. 3) could be coupled to side rail 34b, which would enable the concurrent performance of maintenance operations on both sides of the chassis 20.

As seen in FIG. 3, the carriage-end effector subassembly 24 comprises a carriage 36, a spring-loaded mounting stage 38 translatably coupled to the carriage 36, and an end effector 40 pivotably coupled to the spring-loaded mounting stage 38. The carriage 36 has four wheels 42 which grip the side rail 34a and a carriage motor (not shown in FIG. 3, but see carriage motor 35 in FIG. 11) operatively coupled to at least one wheel of the plurality of wheels 40 for driving rotation of that wheel. The surface of the driven wheel may be configured to provide sufficient traction to move the carriage-end effector subassembly 24 along the side rail 34a during wheel rotation. During travel of the carriage, the spring-loaded mounting stage 38 mechanically presses the end effector 40 against the external surface 84 of the wind turbine blade 12. The end effector 40, which is pivotably coupled to the spring-loaded mounting stage 38, may be provided with surface-riding elements (not shown in FIG. 3), which allows the orientation of the end effector 40 to self-adjust to the changing contour of the external surface 84. For example, these adjustment mechanisms may be designed to keep the end effector normal to the external surface 84 at all times. The surface-riding elements (a.k.a. surface followers) may be rolling wheels or solid rubbing blocks.

Figure 4:
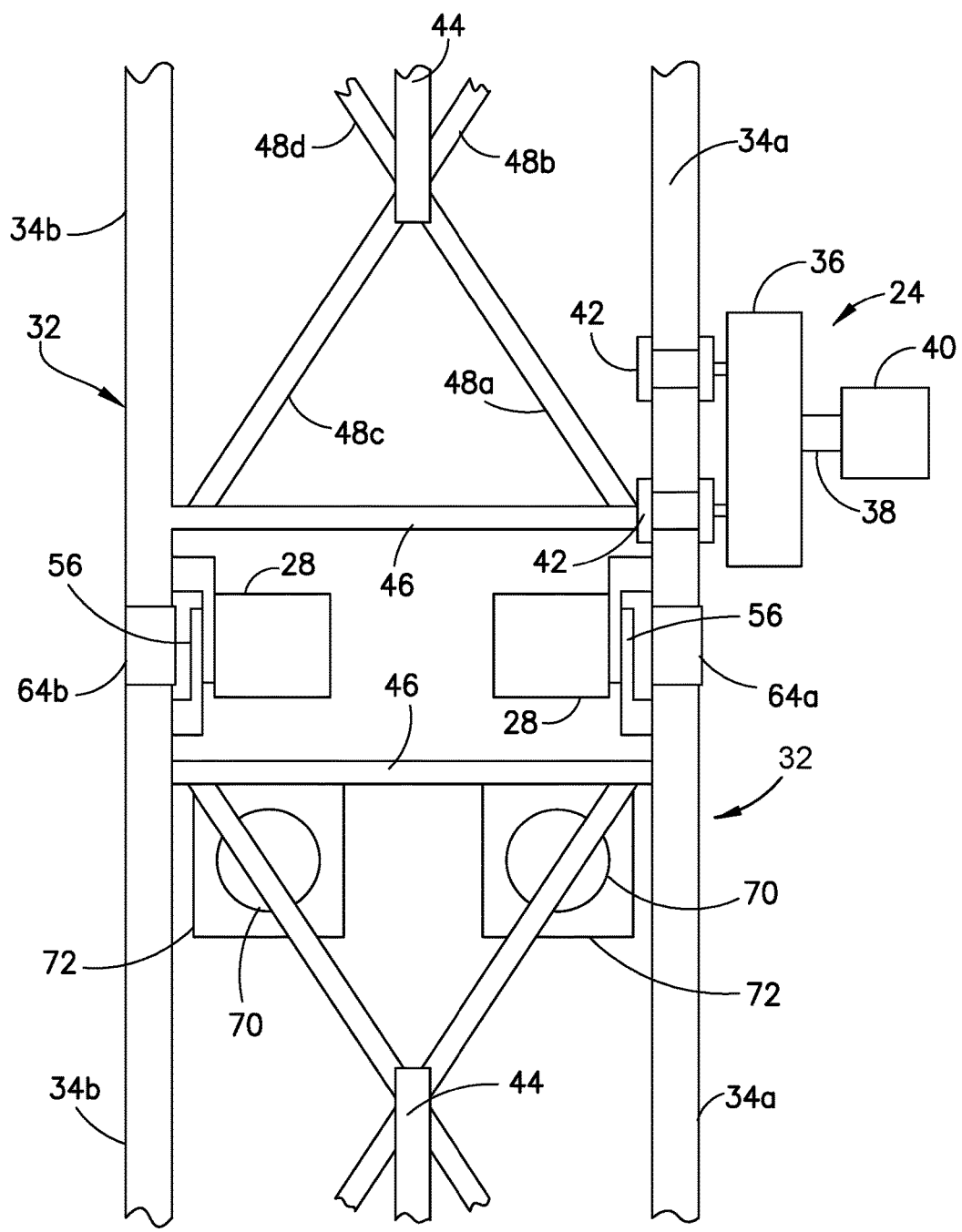
FIG. 4 is a diagram representing a top view of respective portions of coupled frame links of the conformable crawler depicted in FIG. 1 which coupled frame links are pivotably coupled by a pair of hinges, while adjacent rails of the coupled frame links are connected by flexible rail joints.

FIG. 4 is a diagram representing a top view of respective portions of two frame links 32 pivotably coupled by a pair of hinges 56, while adjacent side rails 34a, 34b of the coupled frame links 32 are connected by respective flexible rail joints 64a, 64b. Relative rotation of the two frame links 32 can be driven by respective motors 28 which are coupled to hinges 56 by respective gear trains (not shown in FIG. 4, but see gear trains 74 in FIG. 11). In accordance with one proposed implementation, the motors 28 are stepper motors.

Figure 5:
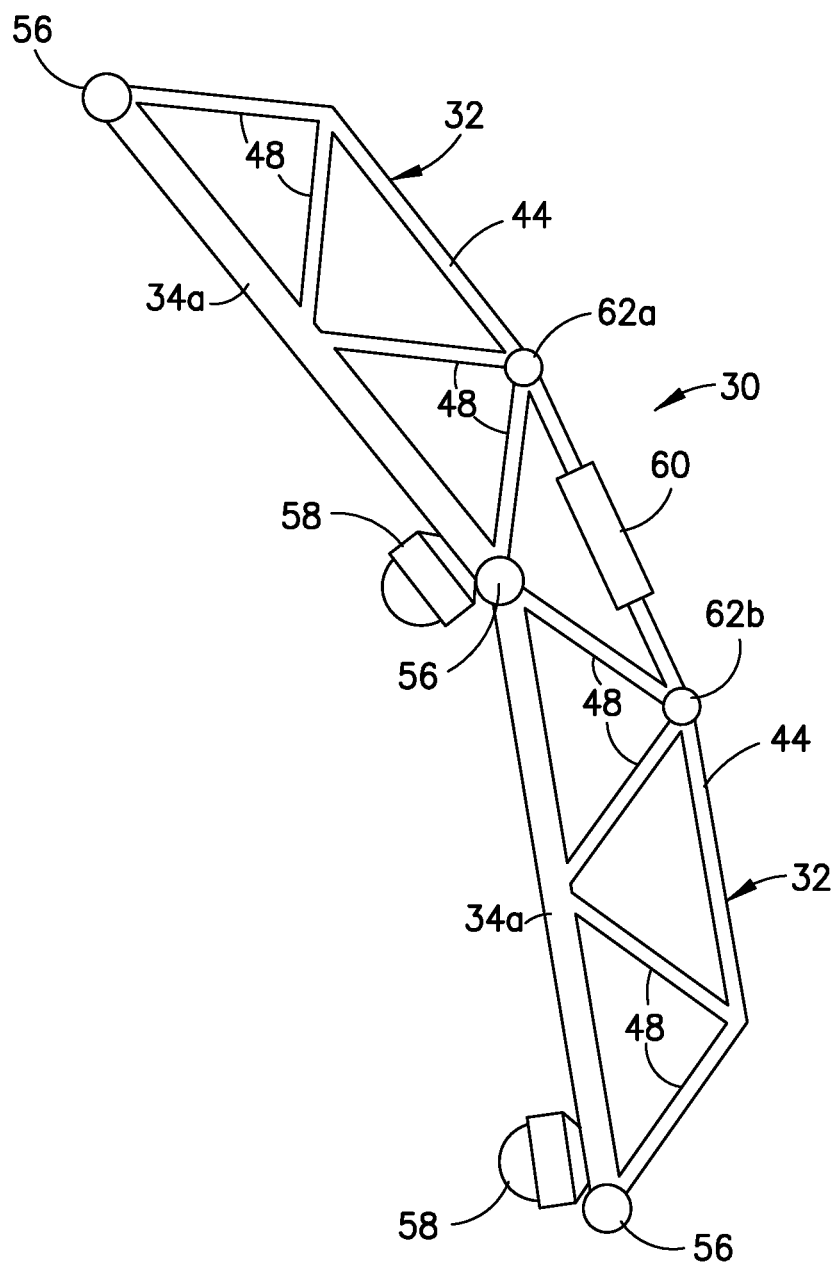
FIG. 5 is a diagram representing a side view of a pair of pivotably coupled frame links which have been rotated relative to each other by at least one jackscrew in accordance with one embodiment. (The flexible rail joints between rails have not been shown so that the hinges are visible.)

In accordance with an alternative embodiment depicted in FIG. 5, relative rotation of the two frame links 32 can be driven by a pair of jackscrews 60 (only one of which is visible in FIG. 5) which are connected at opposite ends thereof to respective revolute joints 62a and 62b located at respective ends of the top beams 44 of the frame links 32. The flexible rail joints 64a seen in FIG. 4 are not shown in FIG. 5 so that the hinges 56 are visible.

The automated apparatus 10 may be initially placed loosely on a wind turbine blade 12 with the center frame link 33 in proximity to the leading edge 16 and with the other frame links 32 hanging downward on both sides of the wind turbine blade. Either the motors 28 or the jackscrews 60 can be operated to cause the frame links to rotate relative to each other until respective portions of the frame segment 30 conform to the contour of the external surface 84 of the wind turbine blade 12. An onboard computer system can be configured to activate the motors 28 or jackscrews 60 to cause the respective portions of the frame segment 30 to conform to the contour of the external surface 84 and then deactivate the motors 28 or jackscrews 60 in response to feedback from pressure-based sensors that indicate when the balls of the ball and socket bearings 58 or the drive rolling elements mounted to the frame links 32 of those portions of the segmented frame 30 are in contact with the external surface 84. As seen in FIG. 5, the top beam 44 of each frame link 32 is connected to the side rail 34*a* (and to the side rail 34*b* not visible in FIG. 5) by a multiplicity of interior beams 48. In accordance with one embodiment, there are eight interior beams 48, only four of which are visible in FIG. 5. Four interior beams 48 (only two of which are visible in FIG. 5) are connected to one end of the top beam 44; the other four interior beams 48 (only two of which are visible in FIG. 5) are connected to the other end of the top beam 44. The truss link structure of each frame link 32 is further illustrated in FIG. 4, which shows four interior beams 48*a*-48*d* connected to one end of the top beam 44 and which shows interior beams 48*a* and 48*b* connected to a cross beam 46. In addition, the side rails 34*a* and 34*b*—which function as track segments—also function as bottom beams that contribute to the rigidity of each frame link 32. As previously mentioned, the side rails 34*a* and 34*b* may be connected by three cross beams 46, in which case two of the interior beams 48 are connected to each of the cross beams disposed near the ends of the frame link 32 and four interior beams 48 are connected to the middle cross beam.

In accordance with some embodiments, the drive rolling element 50 is a first omnidirectional wheel having an axis of rotation which is parallel to the side rails 34*a* and 34*b*, and the chassis further comprises a second omnidirectional wheel having an axis of rotation which is perpendicular to the side rails 34*a* and 34*b*. Omnidirectional wheels are wheels with small discs around the circumference which are perpendicular to the turning direction. The effect is that the omnidirectional wheel can be driven with full force, but will also slide laterally with great ease. Thus the incorporation of pairs of omnidirectional wheels having mutually orthogonal axes of rotation enables pure translational movement of the segmented frame 30 in a spanwise direction, pure circumferential movement around the external surface 84 in a plane perpendicular to the spanwise direction, or movement that has both a spanwise component and a circumferential component.

Figure 6:
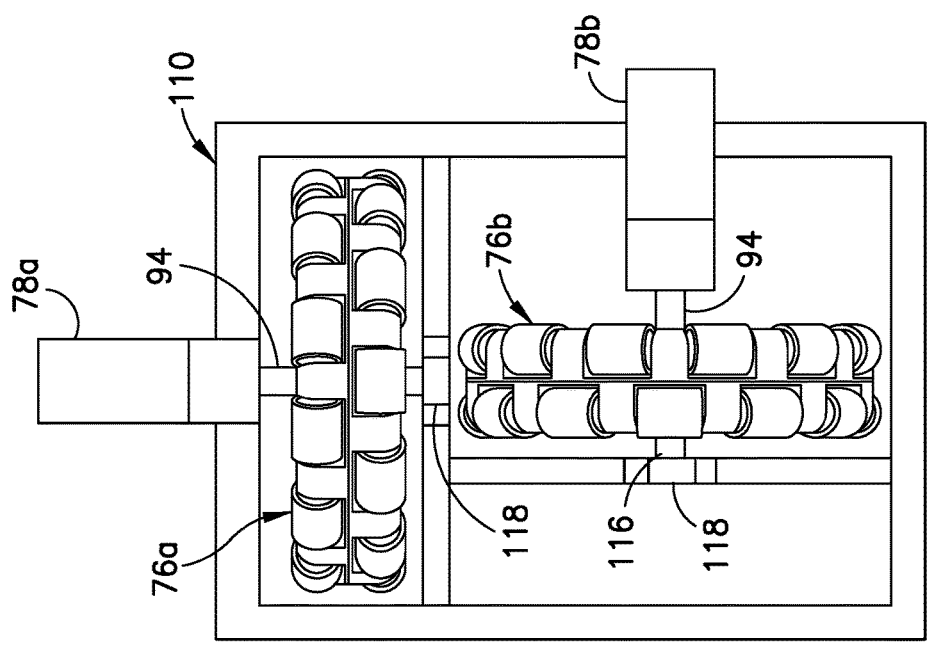
FIG. 6 is a diagram representing a top view of a subassembly comprising a pair of mutually orthogonal motorized omnidirectional wheels in accordance with one embodiment.

FIG. 6 is a diagram representing a top view of a subassembly comprising a pair of mutually orthogonal motorized omnidirectional wheels 76*a* and 76*b* in accordance with one embodiment. One such subassembly may be attached to the center frame link 33 of the segmented frame 30. Alternatively, one such subassembly can be attached to one frame link 32 on one side of the center frame link 33 and another such subassembly can be attached to another frame link 32 on the other side of the center frame link 33. In general, any number of frame links 32 may be equipped with mutually orthogonal motorized omnidirectional wheels. Yet another option would be to equip the center frame link 33 and multiple frame links 32 with pair of mutually orthogonal motorized omnidirectional wheels 76*a* and 76*b*.

For the purpose of illustration, the subsequent disclosure will assume that motorized omnidirectional wheel 76*a* has an axis of rotation disposed in a plane parallel to the side rails 34*a* and 34*b* of the frame link to which it is mounted, in which case rotation of the omnidirectional wheel 76*a* will cause spanwise movement of that frame link, and that motorized omnidirectional wheel 76*b* has an axis of rotation disposed in a plane perpendicular to the side rails 34*a* and 34*b* of the frame link to which it is mounted, in which case rotation of the omnidirectional wheel 76*b* will cause movement of that frame link in a plane perpendicular to the spanwise direction (i.e., movement away from the leading edge 16 and toward the trailing edge 18 of the wind turbine blade 12).

The omnidirectional wheel subassembly depicted in FIG. 6 comprises a frame 110. A pair of motors 78*a* and 78*b* are affixed to the frame 110. The outputs shafts 94 of motors 78*a* and 78*b* are respectively connected to axles 116 to which the omnidirectional wheels 76*a* and 76*b* are mounted. The ends of the axles 116 are seated in respective axle bearings 118 installed in the frame 110. The omnidirectional wheel 76*a* rotates in response to activation of the motor 78*a*, whereas the omnidirectional wheel 76*b* rotates in response to activation of the motor 78*b*. The motors 78*a* and 78*b* can be activated at different times or concurrently. In accordance with one embodiment, the omnidirectional wheels 76*a* and 76*b* may be equipped with rotational encoders for estimating the positions the omnidirectional wheels 76*a* and 76*b*. More specifically, the computer system 100 seen in FIG. 11 may be configured to compute an estimate of position using an odometry-based method.

Figure 7:
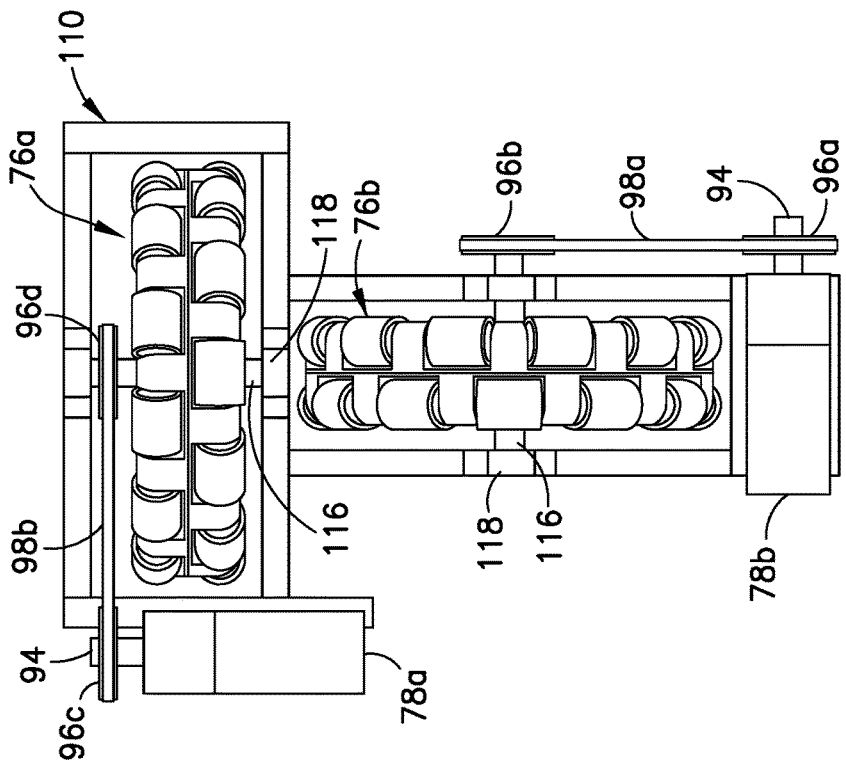
FIG. 7 is a diagram representing a top view of a subassembly comprising a pair of mutually orthogonal motorized omnidirectional wheels in accordance with another embodiment.

FIG. 7 is a diagram representing a top view of a subassembly comprising a pair of mutually orthogonal motorized omnidirectional wheels 76*a* and 76*b* in accordance with another embodiment. The omnidirectional wheel subassembly depicted in FIG. 7 also comprises a frame 110. A pair of motors 78*a* and 78*b* are affixed to the frame 110. Activation of motor 78*a* causes omnidirectional wheel 76*a* to rotate by means of a pulley system comprising a toothed pulley 96*c* mounted on the output shaft 94 of motor 78*a*, a toothed pulley 96*d* mounted on the axle 116 of omnidirectional wheel 76*a* and a toothed belt 98*b* that mechanically couples the toothed pulleys 96*c* and 96*d* so that they rotate in unison. Similarly, activation of motor 78*b* causes omnidirectional wheel 76*b* to rotate by means of a pulley system comprising a toothed pulley 96*a* mounted on the output shaft 94 of motor 78*b*, a toothed pulley 96*b* mounted on the axle 116 of omnidirectional wheel 76*b* and a toothed belt 98*a* that mechanically couples the toothed pulleys 96*a* and 96*b* so that they rotate in unison.

In accordance with some embodiments, the chassis 20 may further comprise a multiplicity of vacuum adherence devices (not shown in FIG. 1, but see vacuum adherence device 64 in FIG. 10) attached to the segmented frame 30. These vacuum adherence devices 64 are configured to provide enhanced adherence of the chassis 20 to the convex curved contours of the external surface 84 of the wind turbine blade 12. In accordance with one proposed implementation, the vacuum adherence devices 64 may comprise floating (i.e., frictionless) suction cups 150 depicted in FIGS. 8A and 8B. All of the floating suction cups 150 attached to the segmented frame 30 base may have a similar if not identical structure.

Figure 8A:
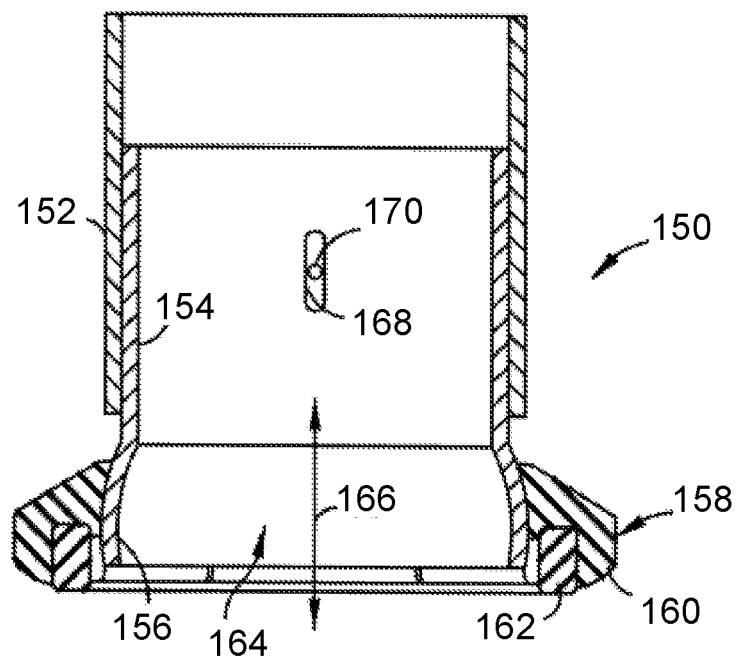
FIG. 8A is a diagram representing a cross-sectional view of a vacuum adherence device in accordance with one implementation.

FIG. 8A is a diagram showing a cross-sectional view of a floating suction cup 150 in accordance with one implementation. This floating suction cup 150 comprises a circular cylindrical sleeve housing 152 and a sleeve 154 having a circular cylindrical portion which is axially slidable along a center axis 166 inside the sleeve housing 152. The sleeve 154 further comprises bearing portion 156 having an outer spherical bearing surface having a center point located along the center axis 166. The bearing portion 156 may be integrally formed with the aforementioned circular cylindrical portion of sleeve 154. The floating suction cup 150 further comprises a pivotable seal assembly 158 comprising a socket ring 160 that holds a seal 162. The socket ring 160 also has an inner spherical bearing surface which is concentric with and pivotably coupled to the outer spherical bearing surface of bearing portion 156 of sleeve 154. The pivot point of the socket ring 160 is collocated with the center point of the outer spherical bearing surface of bearing portion 156 of sleeve 154.

The pivotable seal assembly 158 is configured to rotate relative to the sleeve 154 about the pivot point to at least partially conform to a shape of a confronting surface. The floating suction cup 150 can adhere to such a confronting surface when air is drawn into a channel 164 formed in part by the channel of sleeve housing 152, in part by the channel of sleeve 154, and in part by the opening in the seal 162. The pivotable seal assembly 158 is configured to rotate relative to the sleeve 154 independently of translational movement of the sleeve 154 in a direction parallel to the center axis 166 within the sleeve housing 152. The amount of rotation of pivotable seal assembly 158 may be limited by the size and/or shape of the outer spherical bearing surface of the bearing portion 156 of sleeve 154.

Although not shown in FIG. 8A, the floating suction cup 150 preferably comprises a spring arranged to urge the sleeve 154 to extend out of the sleeve housing 152 by downward (as seen in the view of FIG. 8A) sliding along the center axis 166. This sliding movement may be restricted to within a selected range of movement. However, sleeve 154 may "float" freely relative to sleeve housing 152 within this selected range of movement. This restriction of the translational motion of sleeve 154 can be implemented by providing a slot 168 in the wall of the circular cylindrical portion of sleeve 154 and by providing a pin 170 which extends radially inward from the wall of sleeve housing 152 and into the slot 168. The pin 170 may also be used to hold sleeve 154 inside sleeve housing 152. The length of slot 168 restricts the sliding movement of sleeve 154 relative to sleeve housing 152.

The channel 164 is in fluid communication with a control valve (not shown in FIG. 8A, but see control valve 96 in FIG. 11), which control valve is in turn in flow communication with a vacuum pump (also not shown in FIG. 8A). The vacuum pump, control valve, channel 164, and connecting conduits form a vacuum system which is configured to draw air into the channel 164 such that a vacuum adherence is formed between the pivotable seal assembly 158 and a confronting surface. The vacuum adherence is the result of a vacuum pressure generated inside the channel 164. When the flow of air is reversed, air provided by the pump flows through any gap between the seal 162 and the confronting external surface 84 of the wind turbine blade. The flow of air radially inward through such gap has the effect of producing an air cushion. The height of the gap may vary along the periphery of the seal 162. This gap height depends on the shape of the confronting surface and the degree of rotation of the seal 162 to conform to that shape.

The seal 162 may be formed of any one of a number of different materials. For example, seal 162 may comprise silicone rubber or other elastomeric material, a viscoelastomeric material, or some other suitable flexible material.

Figure 8B:
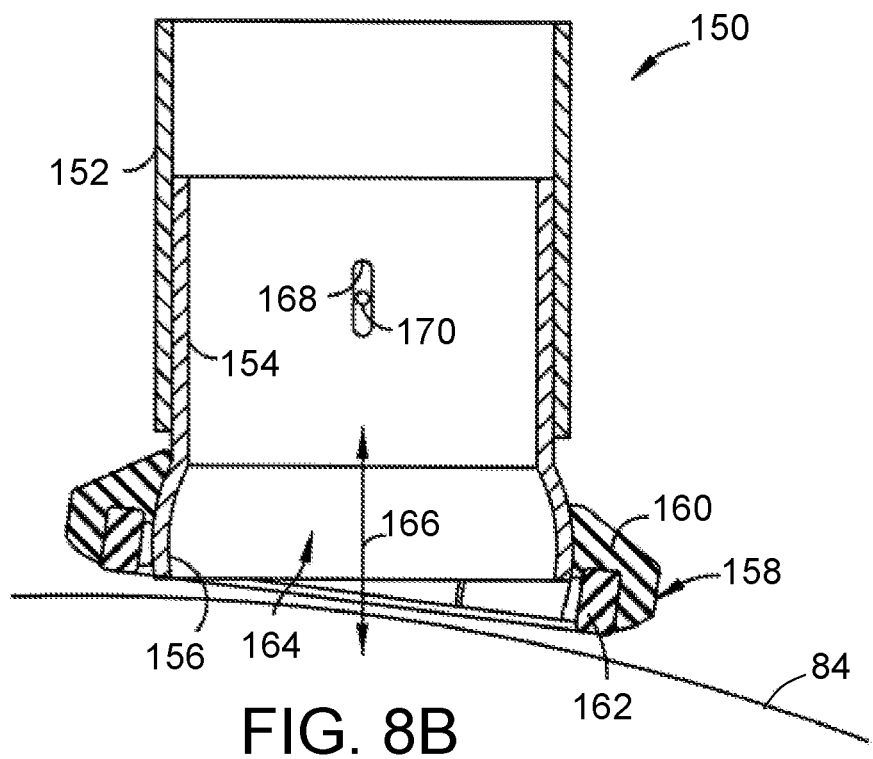
FIG. 8B is a diagram representing a cross-sectional view of the vacuum adherence device depicted in FIG. 8A adhered to a non-planar blade surface. The air gap between the vacuum adherence device and the non-planar surface has been exaggerated for the purpose of illustration.

FIG. 8B shows a cross-sectional view of the floating suction cup 150 depicted in FIG. 8A adhered to a convex curved external surface 84 of a wind turbine blade 12. The air gap between the floating suction cup 150 and the external surface 84 has been exaggerated for the purpose of illustration. The air gap may function as an air bearing that holds the pivotable seal assembly 158 close to the external surface 84, while reducing static friction to within selected tolerances. In other words, the air gap allows pivotable seal assembly 158 to "float" above the external surface 84 while maintaining vacuum adherence between pivotable seal assembly 158 and external surface 84. Further, the air gap allows pivotable seal assembly 158 to be moved over the external surface 84 with a reduced amount of static friction and without causing undesired effects to the surface.

In one embodiment, the seal 162 may be corrugated in such a way as to allow small channels for airflow between the seal 162 and the external surface 84. In some instances, these corrugated channels have been shown to promote vacuum on surfaces of uneven profile or varying surface roughness. In accordance with this embodiment, the corrugations may comprise a low-friction material that further induces sliding such that base motion will be enabled, yet airflow is ensured by the corrugated channels.

Figure 9:
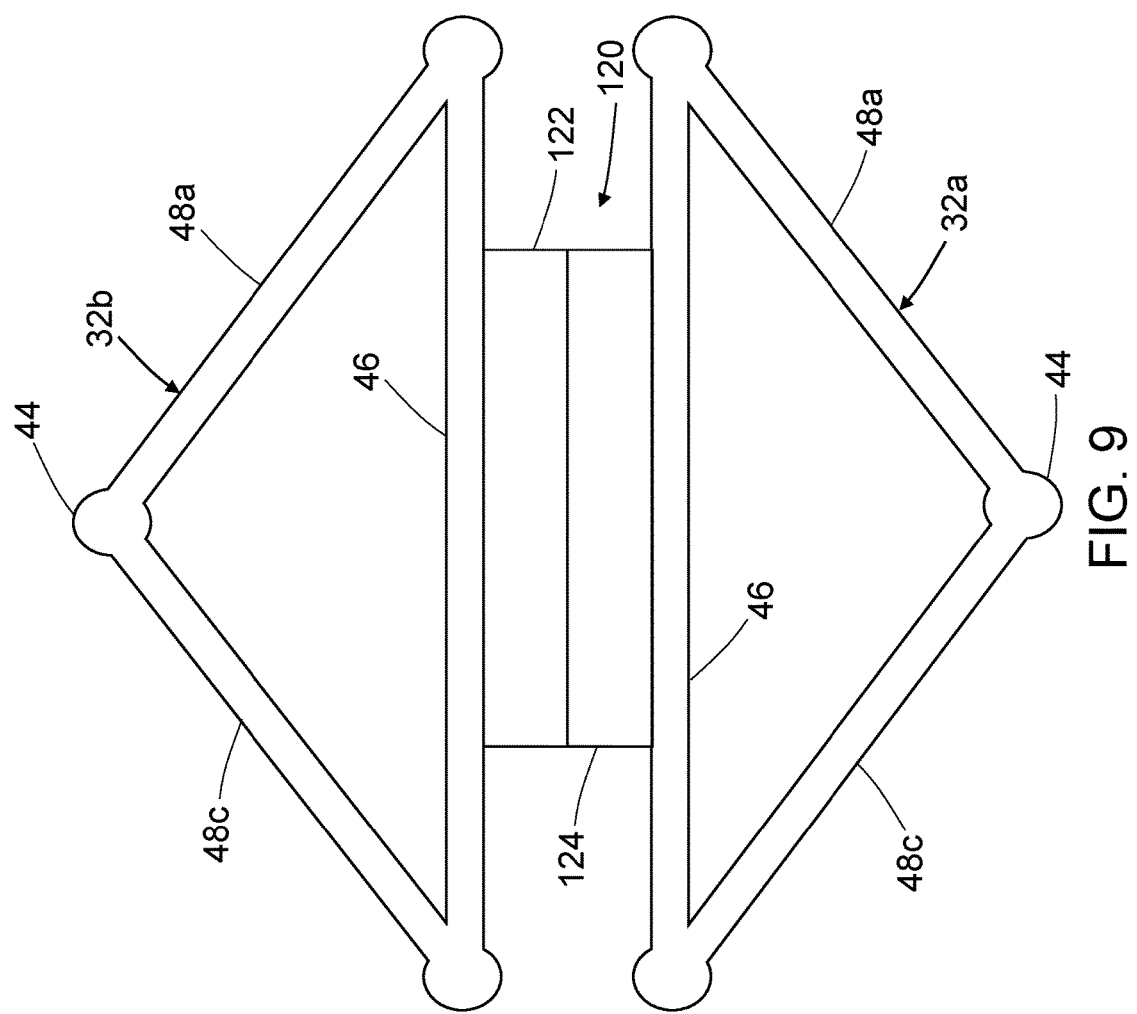
FIG. 9 is a diagram representing an end view of two frame links electromagnetically locked to each other to prevent relative movement of the frame links.

As previously mentioned, at least some of the mutually opposing excess frame links 32 can be locked together to maintain the segmented frame 30 in a correct position during a maintenance procedure. For this purpose, the chassis 20 further comprises a locking device 120 (see FIG. 9). In accordance with various embodiments, the locking device 120 may be used to lock opposing excess frame links 32a and 32b together, thereby preventing the conformable crawler from sliding off of the horizontally oriented wind turbine blade 12, especially in windy conditions.

In accordance with one embodiment, the locking device 120 comprises an electromagnetic lock. In accordance with an alternative embodiment, the locking device 120 comprises a vacuum lock. For the purpose of illustration, one embodiment having an electromagnetic locking device will now be described in some detail. This electromagnetic locking device can be used to electromagnetically lock two excess frame links 32a, 32b to each other to prevent relative movement of those frame links.

In accordance with one proposed implementation, the electromagnetic locking device 120 comprises two locking components mounted on mutually opposing frame links 32a and 32b. The first locking component is an electro-permanent magnet 122 mounted on a cross beam 46 of an excess frame link 32b on one side of the conformable crawler, while the second locking component is a ferromagnetic element 124 mounted on a cross beam 46 of an excess frame link 32a on the other side of the conformable crawler. An attraction force can be produced by turning on the electro-permanent magnet 122. The electro-permanent magnet 122 comprises a permanent magnet having North and South poles and a reversible electromagnet. The electro-permanent magnet 122 will be respectively magnetically coupled to the ferromagnetic element 124, which ferromagnetic element 124 has South and North poles respectively magnetically coupled to the North and South poles of the electro-permanent magnet 122. Additional electromagnetic locking devices (mounted elsewhere on the segmented frame 30) may be employed.

Electro-permanent magnets are solid-state devices that have zero static power consumption (like permanent magnets), but can be switched on and off like electromagnets. The power only needs to be applied for a brief moment to toggle the state to either on or off, which makes it more useful for applications where overall power usage is preferably low. The use of electro-permanent magnets also has the benefit that, if power is lost, the coupling is still active. The electro-permanent magnet approach requires an electrical power source (e.g., a battery carried by the conformable crawler), but it would only need to be energized for a brief moment to switch the magnetic field state.

Figure 10:
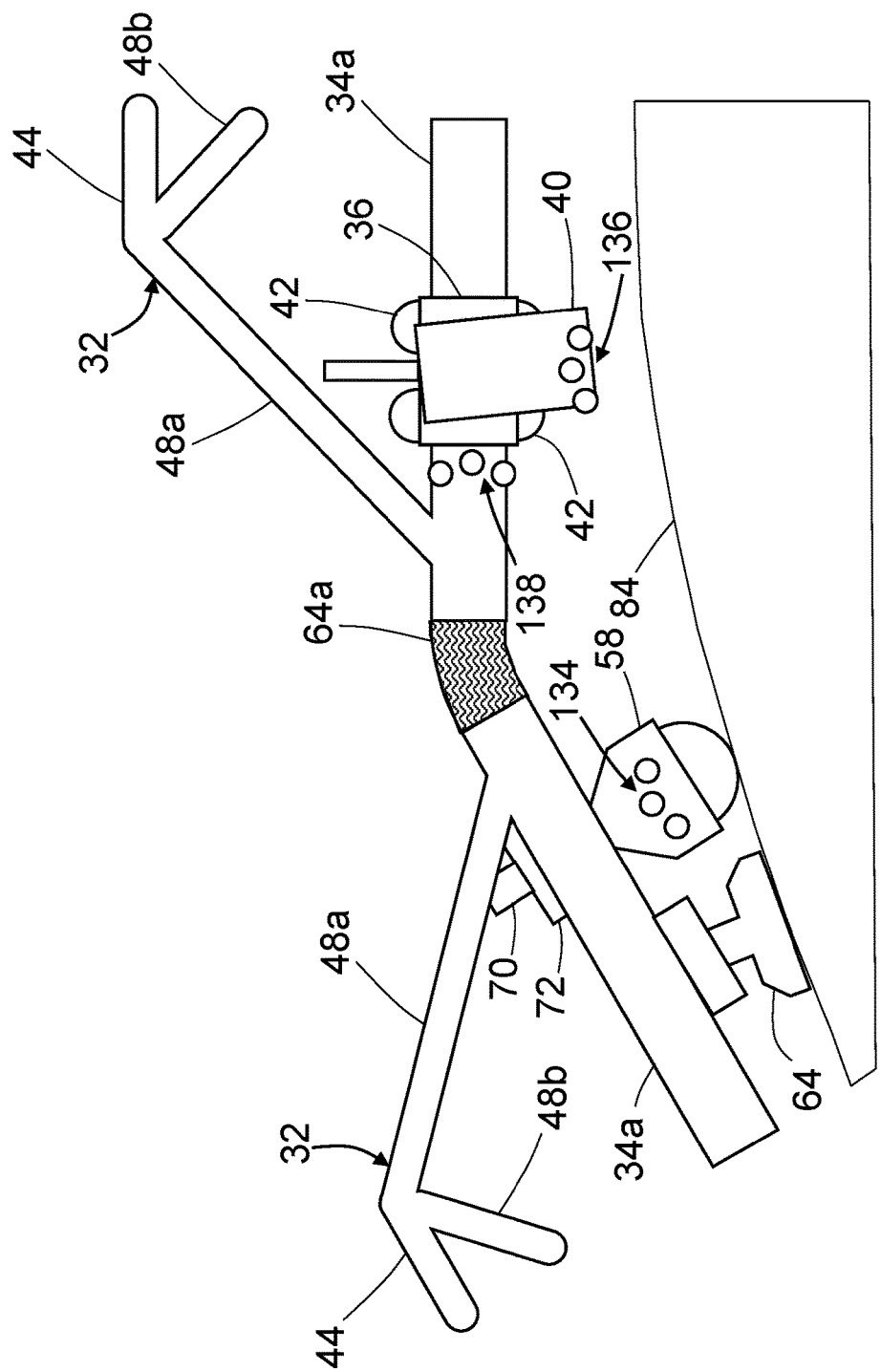
FIG. 10 is a diagram representing a side view of respective coupled portions of coupled frame links of a conformable crawler having suction devices for vacuum adherence to a wind turbine blade and optical targets for motion capture. The frame links are shown in a state wherein respective side rails of those frame links are not aligned.

FIG. 10 is a diagram representing a side view of a portion of a segmented frame 30 having a vacuum adherence device 64 and example optical targets for motion capture attached thereto. The frame links 32 are shown in a state wherein respective side rails 34a of those frame links 32 are not aligned. The example optical targets include a set of three optical targets 134 attached to a socket of a ball and socket bearing 58, a set of three optical targets 136 attached to an end effector 40 and a set of three optical targets 138 attached to a side rail 34a of one of the frame links 32. Each set of three optical targets can be used to provide motion capture guidance and feedback control with respect to whichever component the optical targets are attached to.

Closed-loop feedback control using motion capture systems is disclosed in detail in U.S. Pat. No. 7,643,893, the disclosure of which is incorporated by reference herein in its entirety. In accordance with one embodiment, the motion capture system is configured to measure one or more motion characteristics of one or more controllable devices (e.g., carriage 36, end effector 40, drive rolling element 50 or side rail 34a) as the one or more controllable devices are operating within a control volume. A processor receives the measured motion characteristics from the motion capture system and determines a control signal based on the measured motion characteristics. A position control system receives the control signal and continuously adjusts at least one motion characteristic of the one or more controllable devices in order to maintain or achieve a desired motion state. The controllable device may be equipped with optical targets in the form of passive retro-reflective markers. The motion capture system, the processor, and the position control system comprise a complete closed-loop feedback control system.

In addition, the structure and operation of a system that uses optical motion capture hardware for position and orientation tracking of end effectors (e.g., NDI sensors) are disclosed in detail in U.S. Pat. No. 8,892,252, the disclosure of which is incorporated by reference herein in its entirety. In accordance with a basic system configuration for a motion capture-based tracking method, multiple motion capture cameras (at least two) are set up around the object (e.g., an external surface 84 of a wind turbine blade 12) to be scanned to create a three-dimensional capture volume that captures motion for all six degrees-of-freedom (6-DoF) of the object (e.g., an end effector) being tracked. Each object to be tracked has a respective group of passive retro-reflective markers (at least three) attached thereto, the markers of each group being arranged in a respective unique pattern. The markers of each group are arranged in predetermined patterns, and the information for defining the patterns is stored in a motion capture processor on the ground. Each group of markers may comprise a plurality of small spheres (e.g., about ¼ inch in diameter) attached to the object being tracked. Each motion capture camera can be a video camera of the type comprising a ring of light-emitting diodes (LEDs) surrounding a camera lens. In conjunction with such cameras, each retro-reflective marker may comprise a hemispherical or ball-shaped body coated with retro-reflective paint that reflects impinging light from the LEDs of each camera back toward the associated lens of the respective camera. The motion capture system utilizes data captured from image sensors inside the cameras to triangulate the three-dimensional position of the target object between multiple cameras configured to provide overlapping projections. The motion capture processor collects real-time image information from all of the motion capture cameras, processes the image data, and sends the information along a dedicated connection to a motion tracking and applications computer. At each frame update, the positions of all of the passive markers in the capture volume can be captured by each camera and converted by the motion capture processor into three-dimensional coordinates, which are then associated with the predetermined marker patterns for each tracked object, resulting in a full 6-DoF position and orientation representation for the tracked object.

In the specific application described in this disclosure, the motion capture cameras can be placed at any one of the following locations: (a) on a self-supporting structure; (b) on the nacelle of the wind turbine; (c) on the other blades; (d) on the tower support; and (e) on the crawler pointed back at passive markers attached near the hub of the wind turbine.

In accordance with an alternative embodiment, location tracking of an end effector 40 (or some other component of the automated apparatus 10) can be implemented using a local positioning system (not shown in the drawings) mounted on the hub 14 (see, e.g., FIG. 12A) of the wind turbine or on the root of the wind turbine blade 12. The local positioning system can be controlled from the ground and used to track the location of any component of the automated apparatus having three or more optical targets thereon. A typical local positioning system comprises: a pan-tilt mechanism mounted to the hub or blade root of the wind turbine; a camera mounted to the pan-tilt mechanism; and a laser range meter for projecting a laser beam along an aim direction vector onto each optical target. The pan-tilt mechanism comprises a pan unit and a tilt unit. The camera comprises a housing to which the laser range meter is mounted.

The camera may comprise a still camera (color and/or black and white) to obtain still images, a video camera to obtain color and/or black and white video, or an infrared camera to obtain infrared still images or infrared video of the optical targets. It may be possible to have a single camera that can perform the functions of all of these types. The local positioning system further comprises a computer system which is configured to measure coordinates of the optical targets in the local coordinate system of the wind turbine. In particular, this computer system is programmed to control motions of the pan-tilt mechanism to rotationally adjust the camera to selected angles around the vertical, azimuth (pan) axis and the horizontal, elevation (tilt) axis. The computer system is also programmed to control operation of the camera and receive image data therefrom for transmission to the control station. The computer system is further programmed to control operation of the laser range meter and receive range data therefrom for transmission to the control station. The local positioning system may further comprise a wireless transceiver and an antenna to enable bidirectional, wireless electromagnetic wave communications with a control station.

Measurement data from the laser range meter can be used to obtain estimates of the respective distances from the laser range meter to the optical targets. A typical laser range meter comprises a laser diode which transmits a bundled, usually visible, laser beam toward a surface of a target object. The light which is backscattered and/or reflected by the target object is imaged on the active surface of a photoreceiver by receiving optics. The laser diode has a position and an orientation which are fixed relative to the position and orientation of the video camera; the photoreceiver has a position and an orientation which are fixed relative to the position and orientation of the laser diode. The time-of-flight between transmission and reception of the light can be used to calculate the distance between the laser range meter and the portion of the target object surface on which the transmitted beam impinged. Alternatively, a distance meter which directionally projects wave energy other than a laser beam could be utilized.

The local positioning system preferably has the capabilities described in U.S. Pat. Nos. 9,285,296, 8,447,805 and 7,859,655, the disclosures of which are incorporated by reference herein in their entireties. The image data acquired by the video camera of the local positioning system may undergo image processing as disclosed in U.S. Pat. No. 8,744,133.

Figure 11:
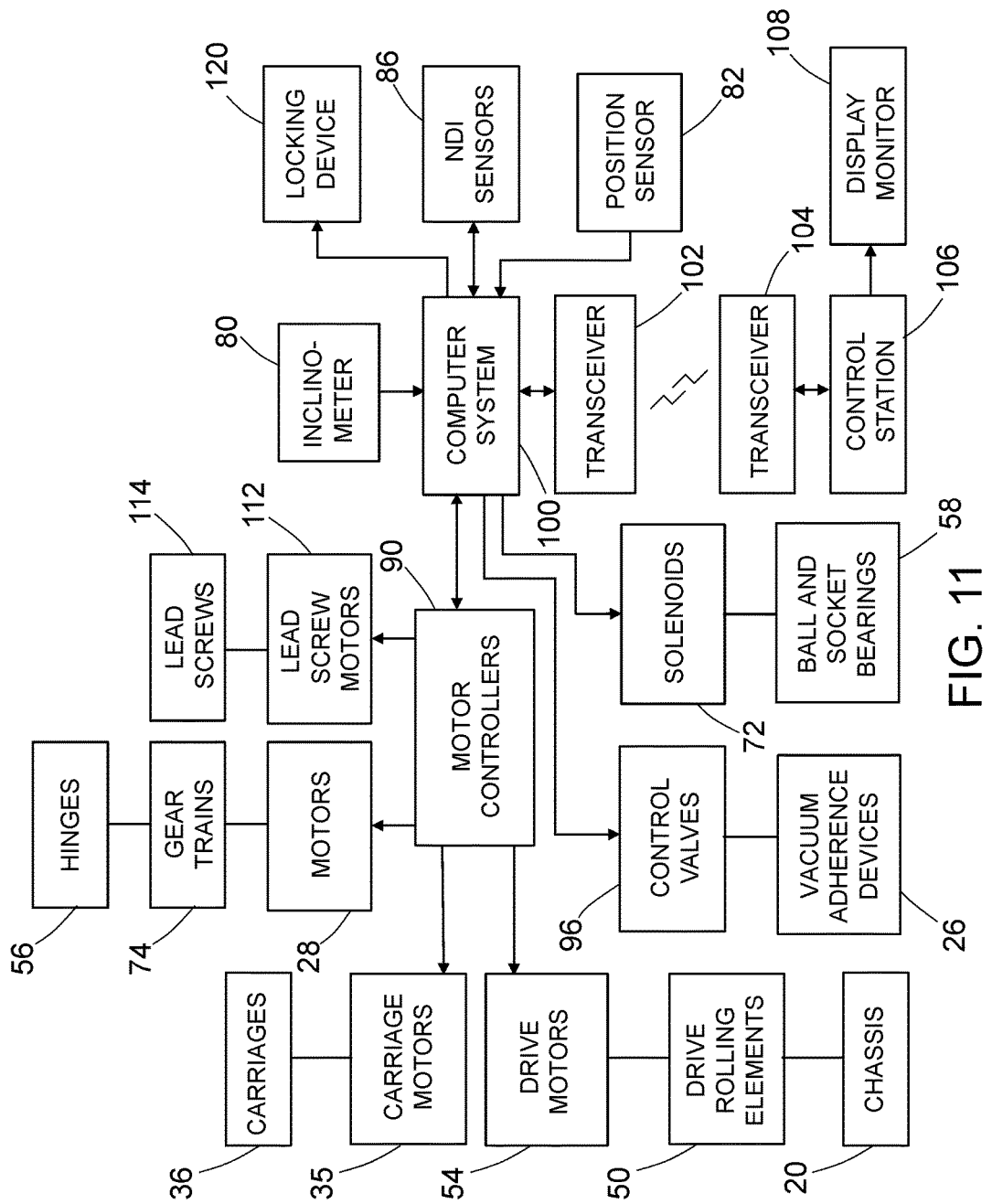
FIG. 11 is a block diagram identifying some components of a computer-controlled apparatus for performing a maintenance operation on a wind turbine blade in accordance with one embodiment.

FIG. 11 is a block diagram identifying some components of a computer-controlled apparatus for performing a maintenance operation on a wind turbine blade in accordance with one embodiment. In this example, the automated apparatus 10 comprises a computer system 100 which is mounted onboard the chassis 20. The computer system 100 may comprise one or more processors configured to control movement of the chassis 20 and operation of the equipment onboard the chassis 20 as a function of radiofrequency commands transmitted by a transceiver 104 of a control station 106. Those radiofrequency commands are received by a transceiver 102 onboard the chassis 20, converted into the proper digital format and then forwarded to the computer system 100. The control station 106 may comprise a general-purpose computer configured with programming for commanding the onboard computer system for controlling movement of the chassis 20 and operation of the equipment onboard the chassis 20.

In this embodiment, the end effector is an NDI sensor 86 (e.g., an ultrasonic transducer array) which operates under the control of the computer system 100. The NDI sensor 86 returns acquired sensor data to the computer system 100. The computer system 100 in turns causes that sensor data to be transmitted to the computer system at the control station 106, which is further configured with programming for processing that sensor data. In particular, the computer system of the control station 106 may comprise a display processor configured with software for controlling a display monitor 108 to display images acquired by the NDI sensor 86.

Figure 17:
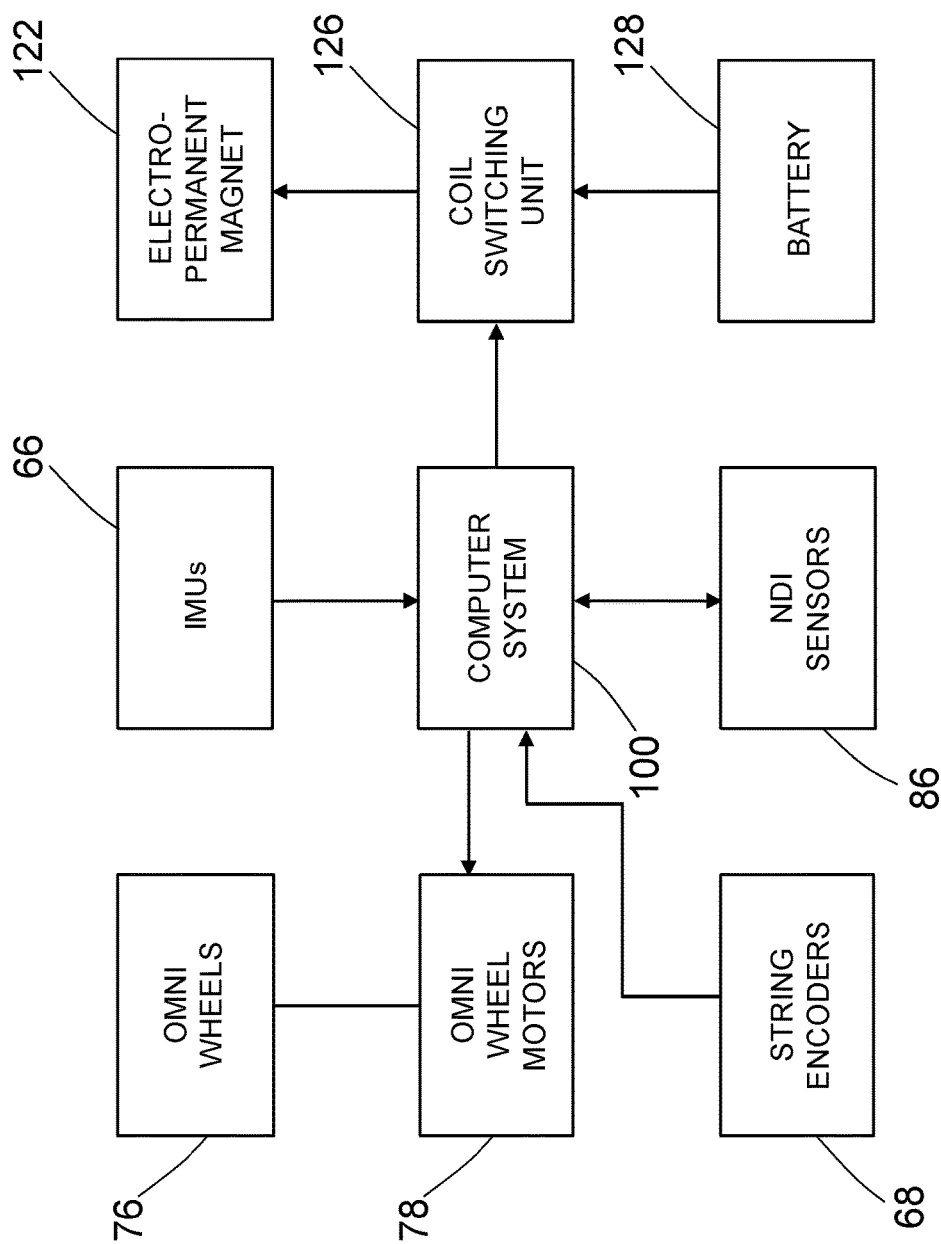
FIG. 17 is a block diagram identifying some components of a computer-controlled system for controlling the position and movements of a motorized chassis and a motorized carriage-end effector subassembly in accordance with an example embodiment.

The computer system 100 is further configured to receive and process sensor data from an inclinometer 80 (or an IMU 66 as shown in FIG. 17) and from a position sensor 82, which sensors may be mounted to the center frame link 33. The purposes for including these sensors will be described in more detail below. In addition, the computer system 100 is configured to control the state of the locking device 120.

As previously described, the automated apparatus 10 in accordance with some embodiments has a multiplicity of ball and socket bearings 58 mounted to plungers 70 of respective solenoids 72 (e.g., electromechanical solenoids). The computer system 100 is programmed to selectively activate any one or more of a multiplicity of solenoids 72 for the purpose of retracting any ball and socket bearings 58 that have obstructions or protrusions in their paths during movement of the chassis 20.

As previously described, the automated apparatus 10 in accordance with some embodiments also has a multiplicity of vacuum adherence devices 26 which are in fluid communication with respective control valves 96. The computer system 100 is programmed to selectively activate one or more of the control valves 96 to open, thereby connecting the associated vacuum adherence device 26 to a source of vacuum pressure. More specifically, the computer system 100 is configured to control the state of a control valve 96 that connects a vacuum pump (not shown in the drawings) to a vacuum manifold assembly (not shown in the drawings). The latter comprises a plurality of vacuum manifolds which are in fluid communication with respective vacuum adherence devices 26. The computer system 100 can be programmed to send a signal that causes a control valve 96 to open. In the valve open state, the vacuum pump will apply a partial vacuum to the vacuum manifold assembly, causing the vacuum adherence devices 26 to adhere to the external surface 84 of the wind turbine blade 12.

The term "manifold" is used herein in the sense of a chamber or duct having several outlets through which a fluid can be distributed or gathered. These manifolds connect channels in the vacuum adherence devices 26 to the vacuum pump, which may be located on the automated apparatus 10 or ground and connected to the manifold by means of an umbilical cable (not shown in the drawings) that may include air lines, electrical lines, and even a water line (e.g., in cases where the end effector is an ultrasonic sensor or sensor array). In accordance with alternative embodiments, each individual vacuum adherence device 26 has a vacuum motor (not shown in the drawings).

In addition, the computer system 100 communicates with a multiplicity of motor controllers 90, which respectively control the operation of various motors, including but not limited to: (a) motors 28 which drive rotation of hinges 56 by way of respective gear trans 74; (b) carriage motors 35 which drive translation of the carriages 36 along the track 22 (by causing at least one of the wheels 42 shown in FIG. 3 to rotate); and (c) drive motors 54 which drive translation of the chassis 20 by causing the drive rolling elements 50 to rotate. The computer system 100 is configured to control the rotations of the frame links 32 about the hinges 56 by sending control signals to the motor controllers 90 that control motors 28. In addition, the computer system 100 is configured to control the movements of the chassis 20 and carriages 36 so that the chassis 20 moves a specified distance in a spanwise direction along the length of the wind turbine blade 12 and then stops, following which the carriages 36 with NDI sensors 86 mounted thereto are moved along the track 22 while the chassis 20 is stationary. These alternating movements may be repeated until the entire wind turbine blade has been scanned from root to tip by the NDI sensors 86. More specifically, the computer system 100 controls operation of the drive motors 54 and carriage motors 35 by sending appropriate control signals to the motor controllers 90 which are respectively associated with those motors.

In accordance with an alternative proposed implementation, instead of using motors 28 to cause the frame links 32 to rotate about hinges 56, jackscrews 60 comprising respective lead screws 114 can be employed, in which case the computer system 100 is configured to control the rotations of the frame links 32 about the hinges 56 by sending control signals to the motor controllers 90 that control operation of lead screw motors 112. Each lead screw 112 may be operated to cause the associated lead screw 114 to rotate. Each jackscrew 60 further comprises a nut that is threadably coupled to the lead screw 114, which nut moves linearly along the axis of the lead screw 114 as the latter rotates, thereby causing the length of the jackscrew 60 to change. Referring again to FIG. 5, increasing the length of the jackscrew 60 would cause the angle between the respective rails 34a of pivotably coupled frame links 32 to decrease;

decreasing the length of the jackscrew 60 would cause the angle between the respective rails 34*a* of pivotably coupled frame links 32 to increase.

A jackscrew 60 can be activated when a proximally located ball and socket bearing 58 needs to be lifted, e.g., for the purpose of passing over a protrusion. In instances wherein ball and socket bearings 58 can be lifted using jackscrews 60, those ball and socket bearings 58 need not be retractable.

The automated apparatus 10 can be assembled on the ground and then installed on a wind turbine blade 12. Various methods can be used to place the center frame link 33 of the automated apparatus 10 in a position overlying an approximately horizontal leading edge 16 of the wind turbine blade 12, with respective portions of the segmented frame 30 hanging vertically downward and extending below the trailing edge 18 of the wind turbine blade (i.e., the excess frame links are not yet locked together) before the start of a maintenance procedure. In this configuration, the segmented frame has a generally inverted-U shape with possibly uneven lengths of the two sides of the hanging segmented frame 30 if the center frame link 33 is not correctly located relative to the leading edge 16 of the wind turbine blade 12.

If the center frame link 33 is not correctly located relative to the leading edge 16 of the wind turbine blade 12, then an adjustment can be made by causing one side of the segmented frame 30 to move upward while the other side moves downward. During this peripheral movement around the external surface 84 of the wind turbine blade 12 (in a plane approximately perpendicular to the spanwise direction of the blade), some of the frame links 32 will roll on the external surface 84 while the orientation of the center frame link 33 is adjusted to achieve a zero slope relative to a horizontal plane. Once the center frame link 33 link has been centered on the leading edge 16 of the wind turbine blade 12, several aspects of alignment are simplified. The slope of the center frame link 33 can be measured using either an inclinometer 80 (see FIG. 11) or an inertial measurement unit (IMU) 66 (see FIG. 17).

An inclinometer is an instrument for measuring angles of slope (or tilt) of an object with respect to the force of gravity. One way to measure tilt angle with reference to the earth's ground plane is to use an accelerometer. An inertial measurement unit works by detecting linear acceleration using one or more accelerometers and rotational rate using one or more gyroscopes. In a typical configuration, an inertial measurement unit comprises one accelerometer and one gyroscope per axis for each of the three vehicle axes: pitch, roll and yaw. The onboard computer system 100 may further comprise a separate processor configured with inertial navigation software that utilizes the raw IMU measurements to calculate attitude, angular rates, linear velocity and position relative to a global reference frame. The data collected from the IMU 66 enables the computer system 100 to track the orientation of the center frame link 33.

The way that the centering works would be that if the sensor detected that the center frame link 33 was not level (i.e., had a non-zero slope), the computer system 100 would send control signals to drive motors 54 to cause one or more drive rolling element 50 having axes of rotation parallel to the spanwise direction to rotate, whereby the segmented frame 30 of the conformable crawler will move clockwise or counter-clockwise around and following the external surface 84 of the wind turbine blade 12 to establish (or re-establish) the level condition of the center frame link 33. This can be accomplished using a closed-loop feedback control process that seeks to reduce if not eliminate any deviation of the slope of the center frame link 33 from zero degrees.

FIG. 12A is a diagram representing a front view of a wind turbine blade 12 having a portion of a conformable crawler of the type depicted in FIG. 1 wrapped around the external surface 84 of a wind turbine blade 12 that is extending radially outward from a hub 14 of the wind turbine. The segmented frame 30 of the conformable crawler includes a center frame link 33 having an IMU 66 mounted thereto. FIG. 12B is a diagram representing an end view of the wind turbine blade 12 in the scenario depicted in FIG. 12A, wherein the center frame link 33 is centered above and level with (i.e., has a slope equal to zero degrees) an approximately horizontal leading edge 16 of the wind turbine blade.

FIGS. 13A and 13B are diagrams similar to FIGS. 12A and 12B respectively, except that in the scenario depicted in FIGS. 13A and 13B, the center frame link 33 is not centered above and level with the approximately horizontal leading edge 16 of the blade. The upward movement of the portion of the segmented frame 30 in front of the wind turbine blade 12 is indicated by the upward-pointing arrow in FIG. 13A. The peripheral movement of the center frame link 33 in a direction that causes its slope to approach zero is indicated by the boldfaced arrow in FIG. 13B.

FIGS. 13A and 13B show using sensor data from the IMU 66 to correct alignment when the center frame link 33 of the segmented frame 30 at the leading edge 16 of the wind turbine 12 is not horizontal. In accordance with additional embodiments, the capabilities of the automated apparatus 10 can be enhanced by providing means for correcting the position of the chassis 20 in the event that the frame links 32 of the segmented frame 30 on which the IMUs are mounted do not lie in the same plane perpendicular to the leading edge 16 (or more precisely, the longitudinal center lines midway between the mutually parallel side rails 34*a* and 34*b* of the frame links do not all lie in that perpendicular plane). In this correction step, the segmented frame 30 is moving around the perimeter of the current section of the wind turbine blade 12 while maintaining contact with the external surface 84 of the blade.

In the scenario depicted in FIG. 13B, the computer system 100 issues control signals that cause the center frame link 33 to move toward the leading edge 16 and in a direction perpendicular to the spanwise direction (while maintaining contact with the external surface 84) until the segmented frame 30 is properly aligned. For example, the center frame link 33 and other frame links 32 may have respective omnidirectional wheels 76*b* (see, e.g., FIG. 6) mounted thereto. The computer system 100 can be configured to send control signals to respective motor controllers 90 (see FIG. 11) for controlling respective motors 48*b* (see, e.g., FIG. 6) that drive rotation of omnidirectional wheels 76*b*.

FIGS. 14A, 14B and 14C are diagrams representing respective front views of a wind turbine blade 12 having a portion of a conformable crawler wrapped around the external surface 84 of the blade, the segmented frame 30 of the conformable crawler including a center frame link 33 having a first IMU 66*a* mounted thereto and a frame link 32 on one side of the segmented frame 30 that has a second IMU 66*b* mounted thereto. A frame link on the other side of the wind turbine blade 12 (which frame link is not visible in FIGS. 14A-14C) has a third IMU mounted thereto. (These three IMUs will be collectively referred to hereinafter as "IMUs 66"). Preferably the second and third of IMUs 66 are equidistant from the first IMU 66*a* when the segmented frame 30 is laid on a flat surface along a straight line.

In this embodiment, the onboard computer system 100 is configured to receive sensor data from the three IMUs 66, which sensor data represents the respective locations of those IMUs 66, and then process that sensor data to determine whether the three IMU locations have the same orientation or not. FIG. 14A shows the segmented frame 30 in a properly aligned position (i.e., the frame links 32 all lie in a plane perpendicular to the leading edge 16 of the wind turbine blade 12). In this case, the onboard computer system 100 is configured to determine that the segmented frame 30 is properly aligned and that no corrective action is called for.

In contrast, FIGS. 14B and 14C show the segmented frame 30 in respective misaligned positions that require respective corrective motions. In these cases, the onboard computer system 100 is configured to determine that the segmented frame 30 is not properly aligned and that corrective action is called for.

In the scenario depicted in FIG. 14B, the computer system 100 receives orientation data from the IMU 66, computes a control response, and issues control signals that cause the center frame link 33 to move in a spanwise direction to the right and further cause the frame links 32 to which the second IMU 66b and the third IMU (not visible in FIG. 14B) are mounted to move in a spanwise direction to the left until the segmented frame 30 is properly aligned. These corrective motions are indicated by respective arrows in FIG. 14B. For example, the frame links to which the three IMUs 66 are mounted may also have respective omnidirectional wheels 76a (see, e.g., FIG. 6) mounted thereto. The computer system 100 can be configured to send control signals to respective motor controllers 90 (see FIG. 11) for controlling respective motors 48a (see, e.g., FIG. 6) that drive rotation of omnidirectional wheels 76a in dependence on the sensor feedback from the IMUs 66.

In the scenario depicted in FIG. 14C, the center frame link 33 is in the correct orientation but the frame links 32 on the opposing sides of the segmented frame 30 are closer to the hub 14 than is the center frame link 33. In this scenario, the computer system 100 issues control signals that cause the frame links 32, to which the second IMU 66b and the third IMU (not visible in FIG. 14C) are mounted, to move in a spanwise direction to the right until the segmented frame 30 is properly aligned. This corrective motion is indicated by an arrow in FIG. 14C.

In some embodiments, the capabilities of the automated apparatus 10 can be further enhanced by mounting a string encoder 68 on the center frame link 33 of the segmented frame 30, installing a string encoder attachment device 130 at the root of the wind turbine blade 12 and the attaching the end of the extended string 132 of the string encoder 68 to the string encoder attachment device 130, as seen in FIG. 15A. The string encoder 68 can be used to measure the distance of the center frame link 33 from the hub, which in turn enables determination of the spanwise position of the center frame link 33 on the wind turbine blade. The computer system 100 can be configured to determine and map the spanwise position of each NDI sensor 86 along the wind turbine blade 12 and then use that position mapping for each NDI sensor 86 to stitch acquired images together.

In some embodiments, one string encoder 68 would be sufficient for crawler position measurement. For that situation, a separate sensor would be needed to let the system know if the crawler is not staying perpendicular to the leading edge 16 of the wind turbine blade 12. For example, IMUs 66 (only IMUs 66a and 66b are shown in FIG. 15A) could be used at the middle and two ends of the crawler to detect when the crawler is not aligned with the blade.

In another embodiment, two or more string encoders 68 can be used to determine if the crawler is not staying perpendicular to the blade, which would by indicated by string encoder lengths that are not equal. In this case, it would not be necessary to have additional IMUs at the ends of the crawler.

FIG. 15B is a diagram representing a front view of a wind turbine blade 12 having a portion of a conformable crawler of the type depicted in FIG. 1 wrapped around the external surface 84 of the blade, the segmented frame 30 of the conformable crawler including a center frame link 33 having an IMU 66 and a first string encoder 68a mounted thereto and a frame link 32 on one side of the segmented frame 30 that has a second string encoder 68b mounted thereto. A frame link on the other side of the wind turbine blade 12 (which frame link is not visible in FIG. 15B) has a third string encoder mounted thereto. (These three string encoders will be collectively referred to hereinafter as "string encoders 68"). Preferably the second and third of string encoders 68 are equidistant from the first encoder string 68a when the longitudinal center lines of the frame links 32 are coplanar. The distance data acquired by the string encoders 68 is received by the computer system 100 (see FIG. 17), which is configured to process that distance data to determine whether the string encoder lengths are equal or not, only taking corrective action in response to a determination that the string encoder lengths are not equal.

FIGS. 16A, 16B and 16C are diagrams representing respective front views of a wind turbine blade 12 having a portion of a conformable crawler wrapped around the external surface 84 of the blade, the segmented frame 30 of the conformable crawler having a center frame link 33 having an IMU and a first string encoder 68a mounted thereto and a frame link 32 on one side of the segmented frame 30 that has a second string encoder 68b mounted thereto. A frame link on the other side of the wind turbine blade 12 (which frame link is not visible in FIGS. 16A-16C) has a third string encoder mounted thereto. Preferably the second and third of string encoders 68 are equidistant from the first string encoder 66a when the longitudinal center lines of the frame links 32 are coplanar.

In this embodiment, the onboard computer system 100 is configured to receive sensor data from the three string encoders 68, which sensor data represents the respective distances of those string encoders 68 from the hub 14, and then process that sensor data to determine whether the three distances are equal or not. FIG. 16A shows the segmented frame 30 in a properly aligned position (i.e., the three string encoders 68 are equidistant from the hub 14 and thus coplanar). In this case, the onboard computer system 100 is configured to determine that the segmented frame 30 is properly aligned and that no corrective action is called for.

In contrast, FIGS. 16B and 16C show the segmented frame 30 in respective misaligned positions that require respective corrective motions. In these cases, the onboard computer system 100 is configured to determine that the segmented frame 30 is not properly aligned and that corrective action is called for.

In the scenario depicted in FIG. 16B, the computer system 100 issues control signals that cause the center frame link 33 to move in a spanwise direction to the right and further cause the frame links 32 to which the second string encoder 68b and the third string encoder (not visible in FIG. 16B) are mounted to move in a spanwise direction to the left until the segmented frame 30 is properly aligned. These corrective motions are indicated by respective arrows in FIG. 16B. For example, the frame links to which the three string encoders 68 are mounted may also have respective omnidirectional wheels 76a (see, e.g., FIG. 6) mounted thereto. The computer system 100 can be configured to send control signals to respective motor controllers 90 (see FIG. 11) for controlling respective motors 78a (see, e.g., FIG. 6) that drive rotation of omnidirectional wheels 76a in dependence on the sensor feedback from the string encoders 68.

In the scenario depicted in FIG. 16C, the center frame link 33 is in the correct position but the frame links 32 on the opposing sides of the segmented frame 30 are closer to the hub 14 than is the center frame link 33. In this scenario, the computer system 100 issues control signals that cause the frame links 32 to which the second string encoder 68b and the third string encoder (not visible in FIG. 16C) are mounted to move in a spanwise direction to the right until the segmented frame 30 is properly aligned. This corrective motion is indicated by an arrow in FIG. 16C.

FIG. 17 is a block diagram identifying some components of a computer-controlled system for controlling the position and movements of a motorized chassis 20 and a motorized carriage-end effector subassembly 24 in accordance with an example embodiment. In this example, the end effector is an NDI sensor 86 (e.g., an ultrasonic transducer array) which operates under the control of the computer system 100. The NDI sensor 86 returns acquired sensor data to the computer system 100 as previously described. The computer system 100 is further configured to receive and process sensor data from the IMUs 66 and string encoders 68, as previously described, sending control signals to the associated motor controllers (not shown in FIG. 17), which control operation of the motors 78 that drive rotation of the omnidirectional wheels 76.

In addition, the computer system 100 is configured to control the state of each locking device 120. As previously described, each locking device 120 may comprise an electro-permanent magnet 122 and a ferromagnetic element 124 mounted to confronting frame links 32. In accordance with one proposed implementation depicted in FIG. 17, the electro-magnet coils of individual electro-permanent magnets 122 are selectively connected to a power source (e.g., a battery 128) by the computer system 100, which is configured with executable code for controlling the states of the electro-permanent magnets 122 by sending switch control signals to a coil switching unit 126. The coil switching unit 126 activates the coils of the electro-permanent magnets 122 in response to the switch control signals from the computer system 100. To activate each electro-permanent magnet 122, a momentary pulse in one direction is used. Another pulse with the current flowing in the opposite direction is used to disable the electro-permanent magnet 122. The rest of the time, there is no electrical power being consumed.

The conformable crawler disclosed herein can be adapted for use in the automation of various maintenance functions, including but not limited to nondestructive inspection, drilling, grinding, fastening, applique application, scarfing, ply mapping, marking, cleaning and painting. There are a number of types of blade components on aircraft that will benefit from maintenance automation, including rotorcraft blades, propeller blades, flaps, ailerons, trim tabs, slats, stabilators and stabilizers. In cases where the end effector 40 is a rotary tool (such as a scarfer, drill, deburrer or reamer), when the rotary tool reaches a target position, the computer system 100 can be programmed to activate an end effector motor (not shown in drawings) via a motor controller to drive rotation of the rotary tool.

Figure 18:
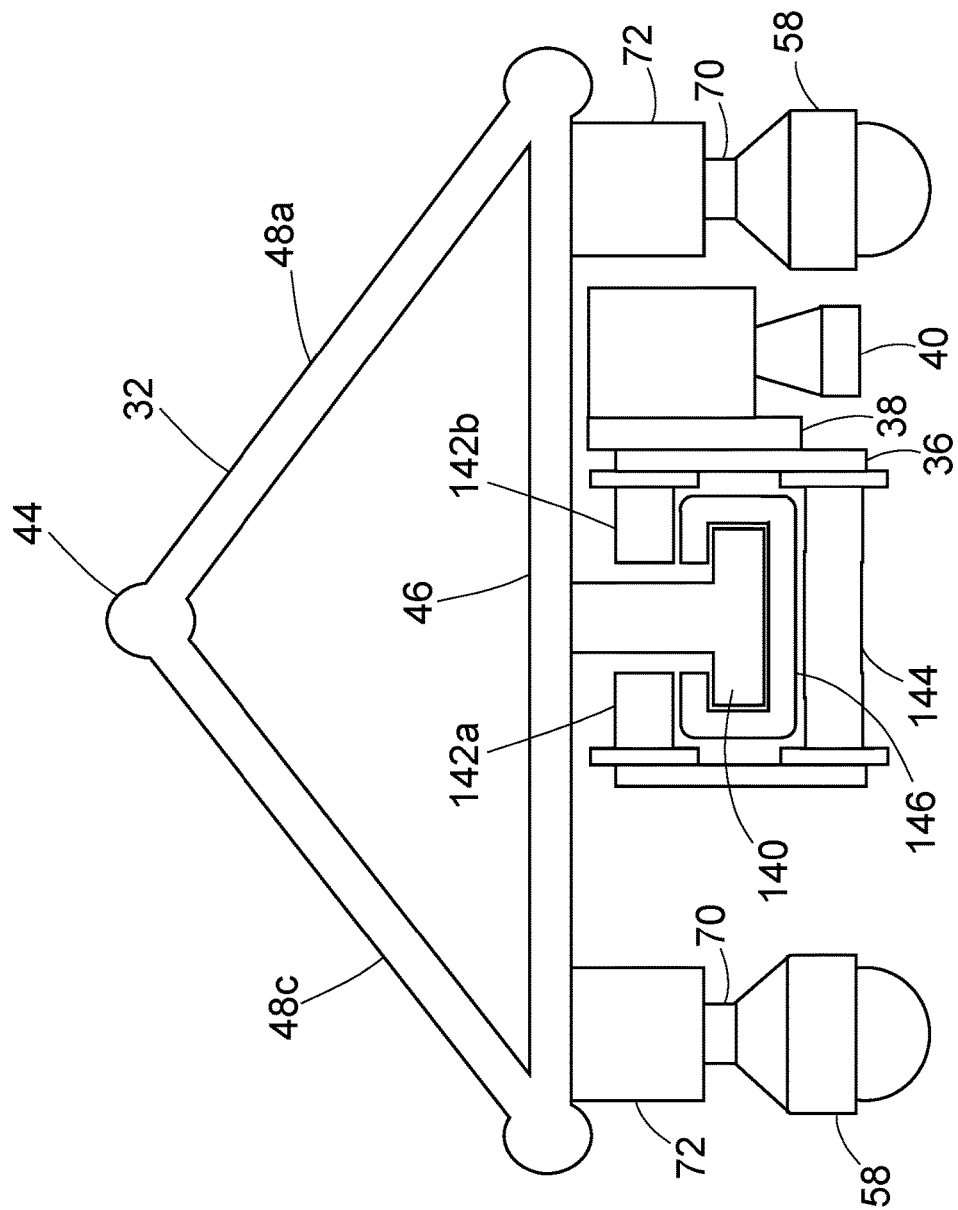
FIG. 18 is a diagram representing an end view of a frame link of a conformable crawler in accordance with an alternative embodiment.

FIG. 18 is a diagram representing an end view of a frame link 32' of a conformable crawler in accordance with an alternative embodiment. Instead of using frame links 32 in which the bottom beams are configured as side rails 34a and 34b, each frame link comprises bottom beams 45a and 45 which are connected by a plurality of cross beams 46, and further comprises a center rail support segment 140 that is attached to or integrally formed with those cross links 46 and projects downward therefrom. From the vantage point of the observer of FIG. 18, the center rail support segment 140 has an inverted T-shaped profile. It should be noted that these frame links 32' are configured so that the confronting ends of the center rail support segments 140 of each pair of pivotably coupled frame links 32' are separated by a gap, which gaps will be bridged by a flexible center rail 146 which may extend the entire length of the segmented frame 30 from one end frame link to the other. As seen in FIG. 18, the flexible center rail 146 may have a C-shaped profile. It could be made of elastomeric or plastic material, so long as the selected material is able to wrap around the shape of the wind turbine blade without cracking.

In accordance with the embodiment depicted in FIG. 18, the carriage 36 comprises a pair of upper wheels 142a and 142b and a lower wheel 144 which roll along the flexible center rail 146. The flexible center rail 146 can be smooth or have undulations/ridges in it that are matched by the wheels to eliminate slippage. An automated apparatus 10 in which the end effector 40 travels along a flexible center rail 146 provides increased stability as compared to embodiments in which end effectors are mounted on one side or the other of the segmented frame 30.

In accordance with an alternative embodiment, the chassis 20 may constructed with side rails 34a, 34b connected by flexible rail joints 6a, 64b and a flexible center rail 146 therebetween.

While automated conformable blade crawlers have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

For the avoidance of doubt, the phrase "one of the frame links", when recited in separate claims, should not be construed to require that the multiple recitations all refer to one and the same frame link. On the contrary, the aforementioned phrase should be construed to include the alternative that separate recitations refer to separate (i.e., different) frame links.

The invention claimed is:

1. An automated apparatus for moving an end effector over a surface of a wind turbine blade, comprising a chassis, a carriage movably coupled to the chassis, and an end effector adjustably coupled to the carriage for adjusting an orientation of the end effector relative to the carriage, wherein the chassis comprises:
   a segmented frame comprising a multiplicity of frame links coupled in series to form a chain, each frame link comprising a respective side rail;
   a multiplicity of flexible rail joints which are arranged to connect the side rails of the segmented frame in series to form a track along which the carriage is configured to travel;
   a motor mounted to the segmented frame; and
   a drive rolling element operatively coupled to the motor.

2. The automated apparatus as recited in claim 1, wherein the chassis further comprises a multiplicity of sets of hinges, each pair of coupled frame links of the segmented frame being pivotably coupled by a respective set of hinges.

3. The automated apparatus as recited in claim 2, wherein the chassis further comprises respective motors operatively coupled to respective hinges of at least one pair of hinges for driving relative rotation of coupled frame links of the segmented frame.

4. The automated apparatus as recited in claim 2, wherein the chassis further comprises at least one jackscrew pivotably coupled to a pair of coupled frame links of the segmented frame for driving relative rotation of those coupled frame links.

5. The automated apparatus as recited in claim 1, wherein the chassis further comprises a locking device comprising a first locking component mounted to one frame link of the segmented frame and a second locking component mounted to another frame link of the segmented frame that is not pivotably coupled to the one segment, and the first and second locking components of the locking device are configured to produce a force that prevents relative movement of the frame links to which the first and second locking components are mounted.

6. The automated apparatus as recited in claim 5, wherein the first locking component is an electro-permanent magnet and the second locking component is a ferromagnetic element.

7. The automated apparatus as recited in claim 1, wherein the chassis further comprises a multiplicity of ball and socket bearings coupled to the segmented frame.

8. The automated apparatus as recited in claim 7, wherein the ball and socket bearings are retractable.

9. The automated apparatus as recited in claim 1, wherein the chassis further comprises a multiplicity of vacuum adherence devices coupled to the segmented frame.

10. The automated apparatus as recited in claim 1, wherein the carriage comprises a plurality of wheels configured to roll along the track and a motor operatively coupled to at least one wheel of the plurality of wheels for driving rotation of the at least one wheel.

11. The automated apparatus as recited in claim 1, further comprising an inclinometer mounted to the segmented frame.

12. The automated apparatus as recited in claim 1, further comprising an inertial measurement unit mounted to the segmented frame.

13. The automated apparatus as recited in claim 1, further comprising a position sensor mounted to the segmented frame.

14. The automated apparatus as recited in claim 13, wherein the position sensor is a string encoder.

15. The automated apparatus as recited in claim 1, wherein the end effector is a non-destructive inspection sensor.

16. An automated apparatus for moving an end effector over a surface of a wind turbine blade, comprising a chassis, a carriage movably coupled to the chassis, and an end effector adjustably coupled to the carriage for adjusting an orientation of the end effector relative to the carriage, wherein the chassis comprises:
   a segmented frame comprising a multiplicity of frame links and a multiplicity of sets of hinges which rotatably couple the frame links in series, each frame link comprising a respective side rail;
   a multiplicity of flexible rail joints, each flexible rail joint being arranged to connect side rails of pivotably coupled frame links to each other to form a track along which the carriage is configured to travel;
   a multiplicity of ball and socket bearings coupled to the segmented frame;
   a first motor mounted to one of the frame links of the segmented frame; and
   a first omnidirectional wheel operatively coupled to the first motor and having an axis of rotation which is perpendicular to the side rail of the frame link to which the first motor is mounted.

17. The automated apparatus as recited in claim 16, further comprising:
   a second motor mounted to one of the frame links of the segmented frame; and
   a second omnidirectional wheel operatively coupled to the second motor and having an axis of rotation which is parallel to the side rail of the frame link to which the second motor is mounted.

18. The automated apparatus as recited in claim 17, further comprising:
   an inclinometer or inertial measurement unit mounted to one of the frame links of the segmented frame;
   a position sensor mounted to one of the frame links of the segmented frame; and
   a computer system disposed onboard the chassis and configured to control the first motor in dependence on sensor data received from the inclinometer or inertial measurement unit and control the second motor in dependence on sensor data received from the position sensor.

19. The automated apparatus as recited in claim 18, wherein the chassis further comprises:
   respective motors operatively coupled to respective hinges for driving relative rotation of coupled frame links of the segmented frame; and
   first and second locking elements of a locking device respectively mounted to first and second frame links which are not coupled to each other by hinges, and wherein the computer system is further configured to control the motors to bring the first and second locking elements into proximity with each other and then control at least the first locking element to lock the locking device.

20. The automated apparatus as recited in claim 18, wherein the chassis further comprises:
at least one jackscrew pivotably coupled to a pair of coupled frame links of the segmented frame for driving relative rotation of those coupled frame links; and
first and second locking elements of a locking device respectively mounted to first and second frame links which are not coupled to each other by hinges, and
wherein the computer system is further configured to control the jackscrew to bring the first and second locking elements into proximity with each other and then control at least the first locking element to lock the locking device.

21. A method for moving an end effector over an external surface of a wind turbine blade, comprising:
(a) wrapping a segmented frame of an automated apparatus around the external surface of the wind turbine blade, the segmented frame being placed so that multiple ball and socket bearings mounted to the segmented frame and drive rolling elements are in contact with the external surface of the wind turbine blade;
(b) moving the end effector over the external surface in a first plane perpendicular to a spanwise direction of the wind turbine blade by moving a motorized carriage-end effector subassembly along a track that is part of the segmented frame while the segmented frame is at a first spanwise position;
(c) moving the segmented frame from the first spanwise position to a second spanwise position by activating the drive rolling elements; and
(d) moving the end effector over the external surface in a second plane perpendicular to the spanwise direction by moving the carriage-end effector subassembly along the track while the segmented frame is at the second spanwise position.

22. The method as recited in claim 21, wherein the end effector is a non-destructive inspection sensor, further comprising:
acquiring first non-destructive inspection sensor data during step (b);
acquiring second non-destructive inspection sensor data during step (d); and
stitching the first and second non-destructive inspection sensor data together.

23. A method for adjusting a peripheral orientation of an automated apparatus relative to a wind turbine blade, comprising:
(a) placing the automated apparatus so that a center frame link of a segmented frame of the automated apparatus is adjacent a horizontally disposed leading edge of the wind turbine blade and so that motorized omnidirectional wheels and ball and socket bearings coupled to the segmented frame are in contact with an external surface of the wind turbine blade on both sides of the leading edge of the wind turbine blade, wherein the motorized drive rolling elements have axes of rotation which are parallel or nearly parallel with the leading edge of the wind turbine blade;
(b) measuring a slope of the center frame link;
(c) determining whether the measured slope deviates from zero degrees; and
(d) in response to a determination in step (c) that the measured slope deviates from zero degrees, actuating the motorized drive rolling elements to roll on the external surface of the wind turbine blades in directions that cause a deviation of the measured slope from zero degrees to decrease in magnitude.

24. An automated apparatus for moving an end effector over a surface of a wind turbine blade, comprising a chassis, a carriage movably coupled to the chassis, and an end effector adjustably coupled to the carriage for adjusting an orientation of the end effector relative to the carriage, wherein the chassis comprises:
a segmented frame comprising a multiplicity of frame links pivotably coupled by hinges in series to form a chain, each frame link comprising a respective side rail;
a multiplicity of flexible rail joints which are arranged to connect the side rails of the segmented frame in series to form a track along which the carriage is configured to travel;
a multiplicity of ball and socket bearings coupled to the segmented frame;
a motor mounted to the segmented frame; and
a drive rolling element operatively coupled to the motor.

25. The automated apparatus as recited in claim 24, wherein each frame link comprises a respective rail support segment, and the chassis further comprises a flexible rail coupled to the rail support segments to form a track which bridges gaps between confronting ends of the rail support segments and to which the carriage is movably coupled.

* * * * *